(12) United States Patent
Chang et al.

(10) Patent No.: US 11,829,631 B2
(45) Date of Patent: *Nov. 28, 2023

(54) PROTECTION OF OBJECTS IN AN OBJECT-BASED STORAGE SYSTEM

(71) Applicant: Pure Storage, Inc., Mountain View, CA (US)

(72) Inventors: Shao-Ting Chang, Milpitas, CA (US); Nicholas Yang, Sunnyvale, CA (US); Ronald Karr, Palo Alto, CA (US)

(73) Assignee: Pure Storage, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,343

(22) Filed: Feb. 6, 2023

(65) Prior Publication Data

US 2023/0185474 A1    Jun. 15, 2023

Related U.S. Application Data

(63) Continuation of application No. 17/159,010, filed on Jan. 26, 2021, now Pat. No. 11,593,017.

(60) Provisional application No. 63/112,963, filed on Nov. 12, 2020, provisional application No. 63/070,671, filed on Aug. 26, 2020, provisional application No. 63/070,677, filed on Aug. 26, 2020.

(51) Int. Cl.
*G06F 3/06*            (2006.01)

(52) U.S. Cl.
CPC ............ *G06F 3/0652* (2013.01); *G06F 3/067* (2013.01); *G06F 3/0622* (2013.01); *G06F 3/0653* (2013.01); *G06F 3/0659* (2013.01)

(58) Field of Classification Search
CPC .... G06F 3/0652; G06F 3/0622; G06F 3/0653; G06F 3/0659; G06F 3/067
See application file for complete search history.

(56) References Cited

U.S. PATENT DOCUMENTS

| | | | |
|---|---|---|---|
| 7,117,322 B2 | 10/2006 | Hochberg et al. | |
| 7,155,466 B2 | 12/2006 | Rodriguez et al. | |
| 7,293,027 B2 | 11/2007 | Margolus | |
| 7,493,350 B2 | 2/2009 | Episale et al. | |
| 7,600,086 B2 | 10/2009 | Hochberg et al. | |
| 7,657,586 B2 | 2/2010 | Rodriguez et al. | |
| 7,716,180 B2 | 5/2010 | Vermeulen et al. | |
| 7,769,722 B1 | 8/2010 | Bergant et al. | |

(Continued)

OTHER PUBLICATIONS

Khot, Purva, et al. "Cloud Migration with Google Cloud Storage and AWS (S3 Service)." 2020 (Year: 2020).*

(Continued)

*Primary Examiner* — Nicholas J Simonetti
(74) *Attorney, Agent, or Firm* — ALG Intellectual Property, LLC

(57) ABSTRACT

An illustrative method includes an object retention management system establishing a retention policy for a bucket of an object-based storage system, detecting an operation that causes an object to be stored within the bucket, and applying, based on the detecting of the operation, the retention policy to the object, wherein the retention policy prevents the object from being deleted or overwritten for a predefined time duration and the retention policy cannot be modified or disabled for the bucket by a user.

20 Claims, 18 Drawing Sheets

(56) References Cited

U.S. PATENT DOCUMENTS

| | | |
|---|---|---|
| 7,801,862 B1 | 9/2010 | Humby et al. |
| 7,814,063 B1 | 10/2010 | Kilday et al. |
| 7,818,300 B1 | 10/2010 | Kilday et al. |
| 7,904,425 B2 | 3/2011 | Cannon et al. |
| 7,958,093 B2 | 6/2011 | Anderson et al. |
| 7,970,743 B1 | 6/2011 | Kilday et al. |
| 7,975,115 B2 | 7/2011 | Wayda et al. |
| 8,001,339 B1 | 8/2011 | Holdman et al. |
| 8,131,809 B2 | 3/2012 | Consul et al. |
| 8,145,606 B2 | 3/2012 | Herbst et al. |
| 8,214,332 B2 | 7/2012 | Anglin et al. |
| 8,452,741 B1 | 5/2013 | Kuhr |
| 8,495,472 B1 | 7/2013 | Magerramov et al. |
| 8,504,797 B2 | 8/2013 | Mimatsu |
| 8,515,914 B2 | 8/2013 | Anglin et al. |
| 8,533,161 B2 | 9/2013 | Mcdonald et al. |
| 8,566,290 B2 | 10/2013 | Mcdonald et al. |
| 8,677,083 B1 | 3/2014 | Mchugh et al. |
| 8,694,476 B2 | 4/2014 | Rodriguez |
| 8,706,914 B2 | 4/2014 | Duchesneau |
| 8,712,980 B2 | 4/2014 | Kilday et al. |
| 8,719,226 B1 | 5/2014 | Jiang et al. |
| 8,799,245 B2 | 8/2014 | Amarendran et al. |
| 8,819,048 B1 | 8/2014 | Abnous et al. |
| 8,822,155 B2 | 9/2014 | Sukumar et al. |
| 8,856,081 B1 | 10/2014 | Chaudhari et al. |
| 8,918,478 B2 | 12/2014 | Ozzie et al. |
| 9,002,805 B1 | 4/2015 | Barber et al. |
| 9,009,111 B2 | 4/2015 | Vermeulen et al. |
| 9,037,596 B2 | 5/2015 | Hsu |
| 9,052,942 B1 | 6/2015 | Barber et al. |
| 9,201,877 B1 | 12/2015 | Humby et al. |
| 9,262,496 B2 | 2/2016 | Kumarasamy et al. |
| 9,275,063 B1 | 3/2016 | Natanzon |
| 9,280,678 B2 | 3/2016 | Redberg |
| 9,395,922 B2 | 7/2016 | Nishikido et al. |
| 9,552,299 B2 | 1/2017 | Stalzer |
| 9,613,038 B2 | 4/2017 | Factor et al. |
| 9,632,875 B2 | 4/2017 | Raichstein et al. |
| 9,658,983 B1 | 5/2017 | Barber et al. |
| 9,678,962 B2 | 7/2017 | Pinkney et al. |
| 9,740,403 B2 | 8/2017 | Storer et al. |
| 9,773,005 B2 | 9/2017 | Humby et al. |
| 9,864,874 B1 | 1/2018 | Shanbhag et al. |
| 9,912,752 B1 | 3/2018 | Davis et al. |
| 9,922,035 B1 | 3/2018 | Ulman et al. |
| 9,928,247 B2 | 3/2018 | Ten-Pow et al. |
| 9,959,280 B1 | 5/2018 | Whitehead et al. |
| 9,959,333 B2 | 5/2018 | Kumarasamy et al. |
| 10,025,673 B1 | 7/2018 | Maccanti et al. |
| 10,025,734 B1 | 7/2018 | Caruso et al. |
| 10,042,859 B1 | 8/2018 | Nandakumar |
| 10,095,549 B1 * | 10/2018 | Needham .............. G06F 21/602 |
| 10,102,356 B1 | 10/2018 | Sahin et al. |
| 10,185,495 B2 | 1/2019 | Katsuki |
| 10,324,639 B2 | 6/2019 | Seo |
| 10,402,369 B2 | 9/2019 | Pidduck |
| 10,474,630 B2 | 11/2019 | Humby et al. |
| 10,503,700 B1 | 12/2019 | Sanvido |
| 10,503,713 B1 | 12/2019 | Gattu et al. |
| 10,528,536 B1 | 1/2020 | Gattu et al. |
| 10,534,726 B2 | 1/2020 | Mchugh et al. |
| 10,545,699 B2 | 1/2020 | Baptist et al. |
| 10,564,885 B1 | 2/2020 | Iaravu et al. |
| 10,567,406 B2 | 2/2020 | Astigarraga et al. |
| 10,585,854 B2 | 3/2020 | Seker et al. |
| 10,810,088 B1 | 10/2020 | Gu et al. |
| 10,846,137 B2 | 11/2020 | Vallala et al. |
| 10,877,683 B2 | 12/2020 | Wu et al. |
| 11,106,810 B2 | 8/2021 | Natanzon et al. |
| 11,341,230 B1 | 5/2022 | Ponnuswamy et al. |
| 2005/0055518 A1 | 3/2005 | Hochberg et al. |
| 2006/0004868 A1 | 1/2006 | Claudatos et al. |
| 2006/0026220 A1 | 2/2006 | Margolus |
| 2006/0075007 A1 | 4/2006 | Anderson et al. |
| 2006/0282630 A1 | 12/2006 | Hochberg et al. |
| 2007/0061359 A1 | 3/2007 | Kilday |
| 2007/0113031 A1 | 5/2007 | Brown et al. |
| 2007/0136381 A1 | 6/2007 | Cannon et al. |
| 2007/0239715 A1 | 10/2007 | Debie |
| 2008/0184329 A1 | 7/2008 | Cross et al. |
| 2010/0088270 A1 | 4/2010 | Zegler |
| 2010/0138500 A1 | 6/2010 | Consul et al. |
| 2010/0312751 A1 | 12/2010 | Anglin et al. |
| 2011/0035540 A1 | 2/2011 | Fitzgerald et al. |
| 2011/0093471 A1 | 4/2011 | Brockway et al. |
| 2011/0106770 A1 | 5/2011 | Mcdonald et al. |
| 2011/0106771 A1 | 5/2011 | Mcdonald et al. |
| 2012/0089572 A1 | 4/2012 | Raichstein et al. |
| 2012/0215742 A1 | 8/2012 | Anglin et al. |
| 2012/0246126 A1 | 9/2012 | Rodriguez et al. |
| 2013/0238575 A1 | 9/2013 | Amarendran et al. |
| 2014/0289277 A1 | 9/2014 | Pinkney et al. |
| 2015/0134619 A1 | 5/2015 | Factor et al. |
| 2015/0199367 A1 | 7/2015 | Hammer et al. |
| 2016/0224651 A1 | 8/2016 | Kumarasamy et al. |
| 2016/0259798 A1 | 9/2016 | Humby et al. |
| 2016/0259799 A1 | 9/2016 | Pidduck |
| 2017/0032006 A1 | 2/2017 | Anglin et al. |
| 2017/0060897 A1 | 3/2017 | Madaan et al. |
| 2017/0093913 A1 | 3/2017 | Summers et al. |
| 2017/0277435 A1 | 9/2017 | Wadhwa et al. |
| 2017/0371890 A1 | 12/2017 | Seker et al. |
| 2018/0293024 A1 | 10/2018 | Baptist et al. |
| 2019/0034294 A1 | 1/2019 | Tirado |
| 2019/0108246 A1 | 4/2019 | Jois et al. |
| 2019/0147064 A1 | 5/2019 | Wee et al. |
| 2019/0166179 A1 | 5/2019 | Bestler |
| 2019/0171365 A1 | 6/2019 | Power et al. |
| 2019/0272335 A1 | 9/2019 | Liu et al. |
| 2019/0347046 A1 | 11/2019 | Baptist et al. |
| 2019/0370236 A1 | 12/2019 | Cheru et al. |
| 2019/0377802 A1 | 12/2019 | Aber |
| 2020/0110733 A1 | 4/2020 | Gattu et al. |
| 2020/0394078 A1 | 12/2020 | Taneja et al. |

OTHER PUBLICATIONS

Hwang, et al., "RAID-x: A New Distributed Disk Array for I/O-Centric Cluster Computing", Proceedings the Ninth International Symposium on High-Performance Distributed Computing, 2000, pp. 279-286.

Kunz, Immanuel, et al., "Towards Tracking Data Flows in Cloud Architectures", 2020 IEEE 13th International Conference on Cloud Computing (CLOUD). IEEE, 2020, Jul. 10, 2020.

Saffady, et al., "Big Bucket Retention Objectives, Issues, Outcomes", Information Management 52.6 (2018).

Stalzer, et al., "FlashBlades: System Architecture and Applications", Proceedings of the 2nd Workshop on Architectures and Systems for Big Data, Association for Computing Machinery, New York, NY, 2012, pp. 10-14.

Storer, et al., "Pergamum: Replacing Tape with Energy Efficient, Reliable, Disc-Based Archival Storage", FAST'08: Proceedings of the 6th USENIX Conference on File and Storage Technologies, Feb. 2008, Article No. 1, pp. 1-16.

* cited by examiner

PROTECTION OF OBJECTS IN AN OBJECT-BASED STORAGE SYSTEM

RELATED APPLICATIONS

This application is a continuation application of U.S. patent application Ser. No. 17/159,010, filed Jan. 26, 2021, which claims priority under 35 U.S.C. § 119(e) to U.S. Provisional Patent Application No. 63/112,963, filed Nov. 12, 2020, U.S. Provisional Patent Application No. 63/070,671, filed Aug. 26, 2020, and to U.S. Provisional Patent Application No. 63/070,677, filed Aug. 26, 2020, each of which is incorporated herein by reference in its entirety.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DESCRIPTION OF EMBODIMENTS

Figure 1A:
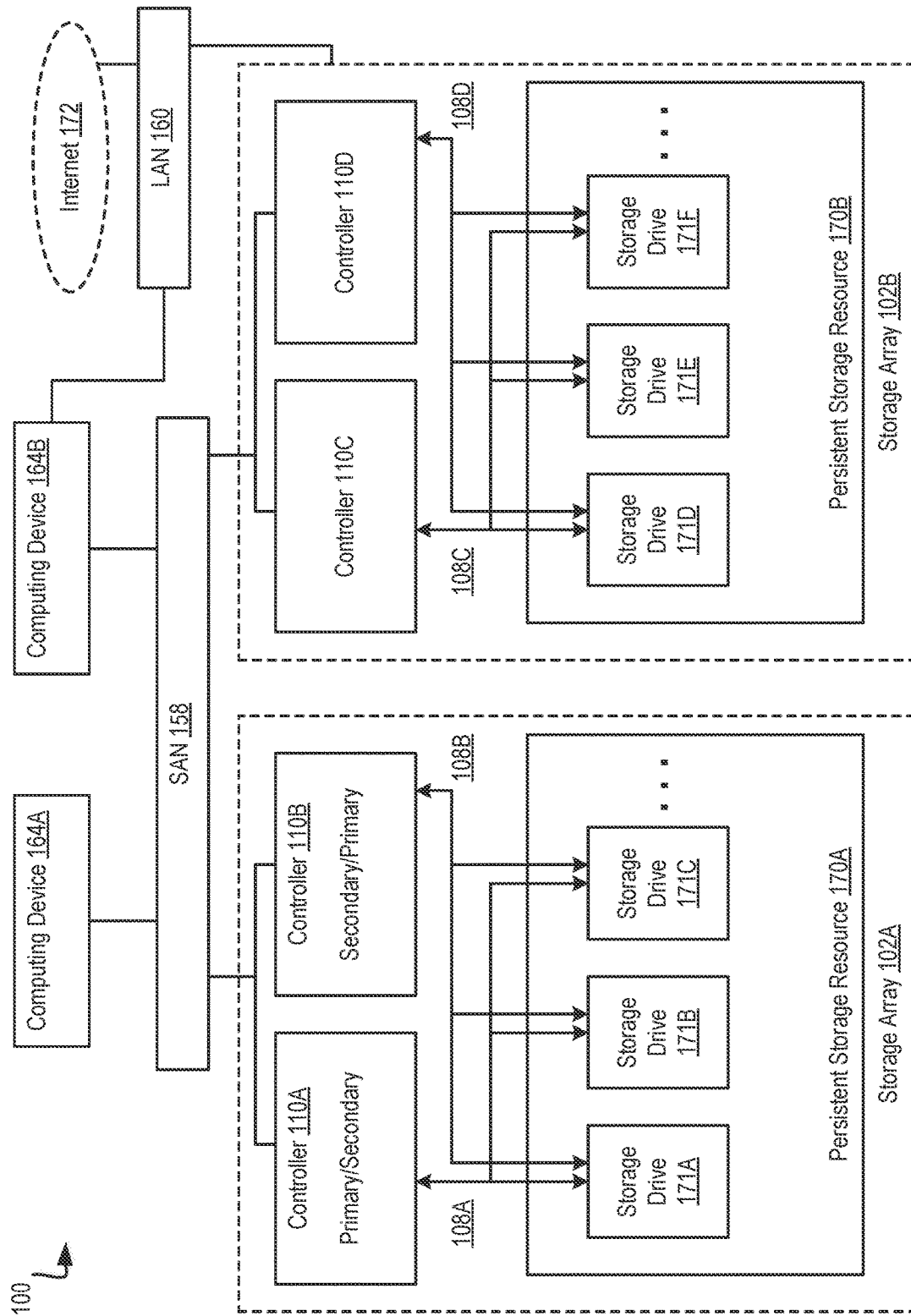
FIG. 1A illustrates a first example system for data storage in accordance with some implementations.

Example methods, apparatus, and products for protecting objects in an object store from deletion or overwriting in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
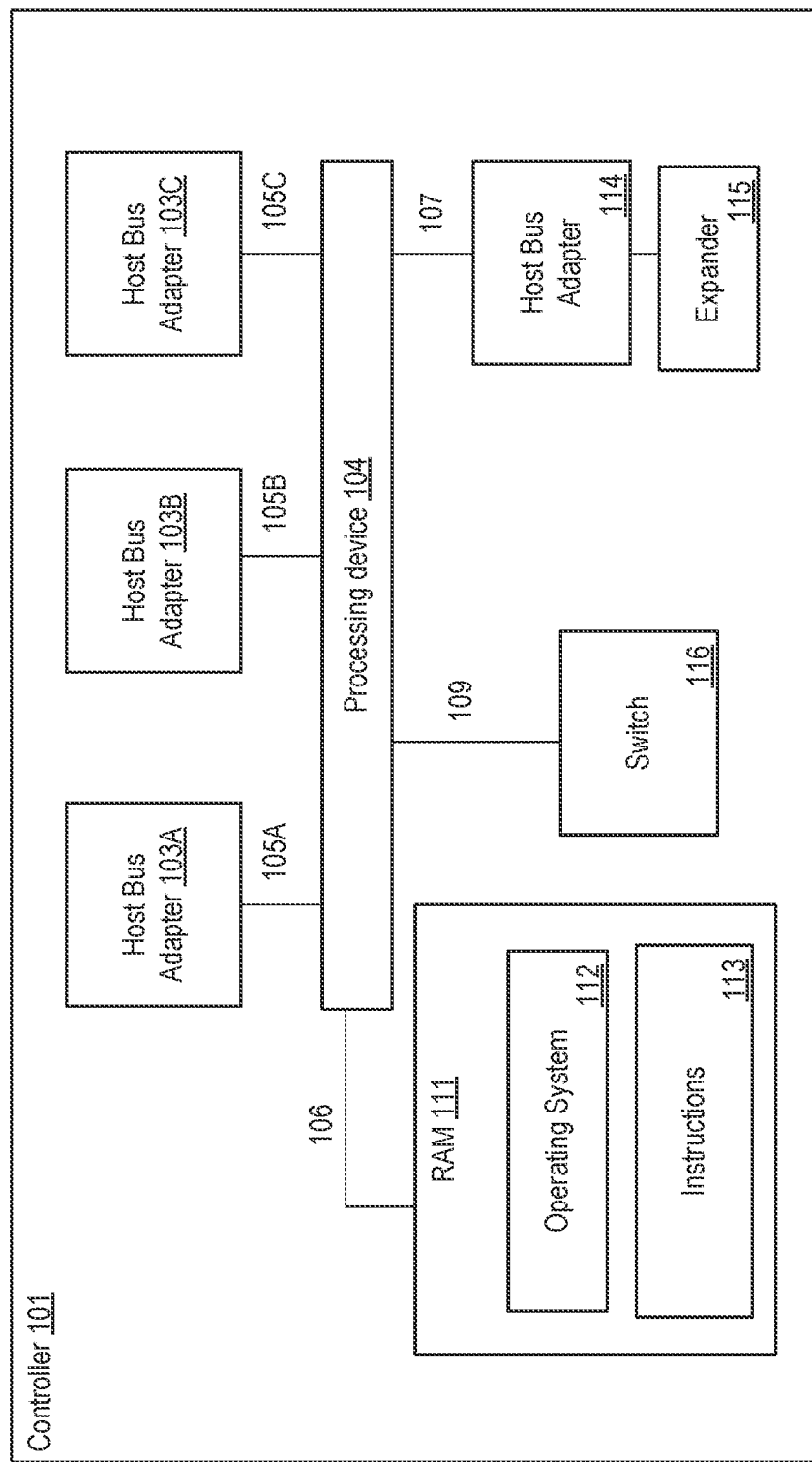
FIG. 1B illustrates a second example system for data storage in accordance with some implementations.

FIG. 1B illustrates an example system for data storage, in accordance with some implementations. Storage array controller 101 illustrated in FIG. 1B may similar to the storage array controllers 110A-D described with respect to FIG. 1A. In one example, storage array controller 101 may be similar to storage array controller 110A or storage array controller 110B.

Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an ASIC, an FPGA, a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

In implementations, storage drive 171A-F may be one or more zoned storage devices. In some implementations, the one or more zoned storage devices may be a shingled HDD. In implementations, the one or more storage devices may be a flash-based SSD. In a zoned storage device, a zoned namespace on the zoned storage device can be addressed by groups of blocks that are grouped and aligned by a natural size, forming a number of addressable zones. In implementations utilizing an SSD, the natural size may be based on the erase block size of the SSD.

The mapping from a zone to an erase block (or to a shingled track in an HDD) may be arbitrary, dynamic, and hidden from view. The process of opening a zone may be an operation that allows a new zone to be dynamically mapped to underlying storage of the zoned storage device, and then allows data to be written through appending writes into the zone until the zone reaches capacity. The zone can be finished at any point, after which further data may not be written into the zone. When the data stored at the zone is no longer needed, the zone can be reset which effectively deletes the zone's content from the zoned storage device, making the physical storage held by that zone available for the subsequent storage of data. Once a zone has been written and finished, the zoned storage device ensures that the data stored at the zone is not lost until the zone is reset. In the time between writing the data to the zone and the resetting of the zone, the zone may be moved around between shingle tracks or erase blocks as part of maintenance operations within the zoned storage device, such as by copying data to keep the data refreshed or to handle memory cell aging in an SSD.

In implementations utilizing an HDD, the resetting of the zone may allow the shingle tracks to be allocated to a new, opened zone that may be opened at some point in the future. In implementations utilizing an SSD, the resetting of the zone may cause the associated physical erase block(s) of the zone to be erased and subsequently reused for the storage of data. In some implementations, the zoned storage device may have a limit on the number of open zones at a point in time to reduce the amount of overhead dedicated to keeping zones open.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
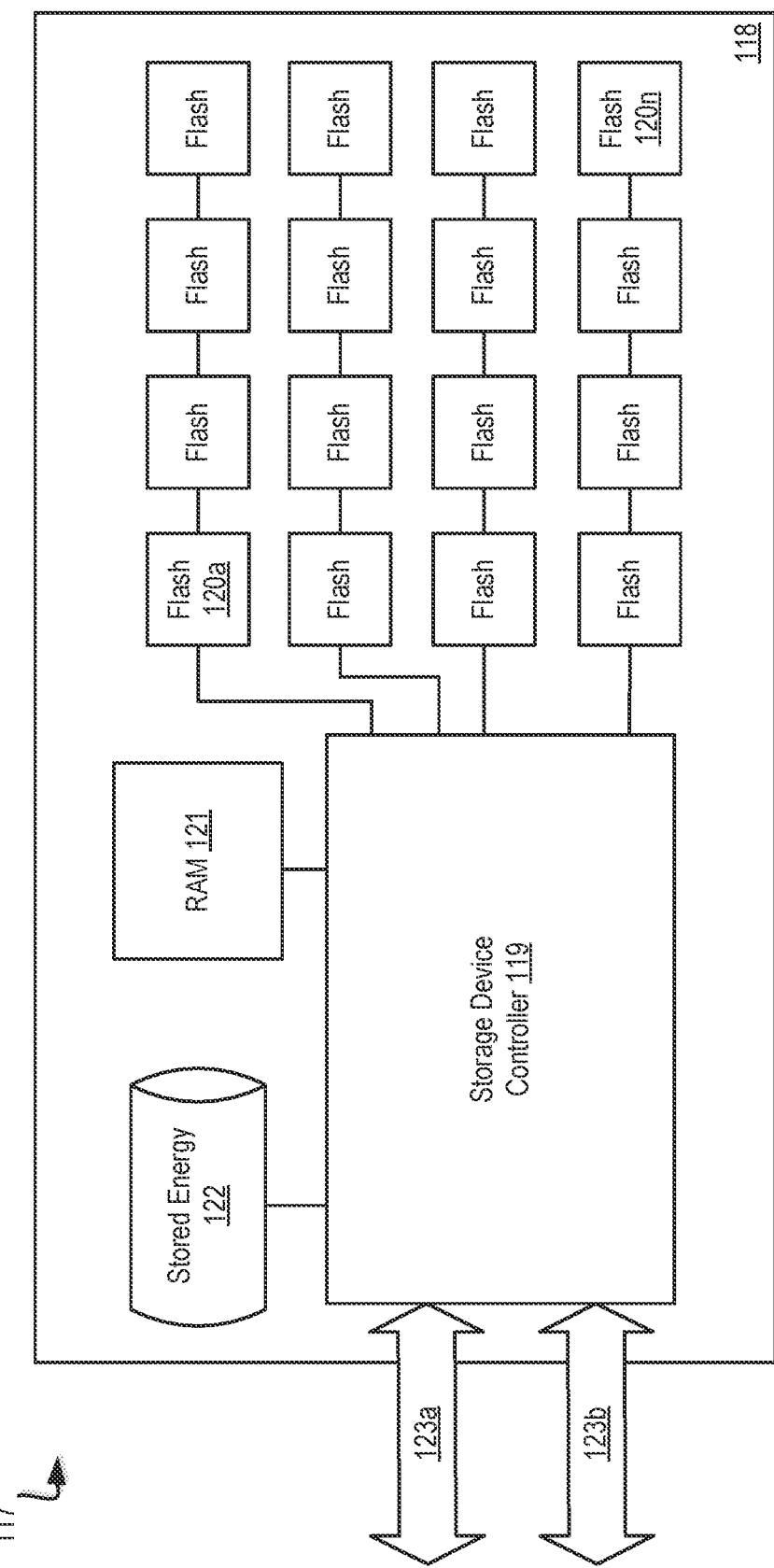
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage controller 119. In one embodiment, storage controller 119A-D may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
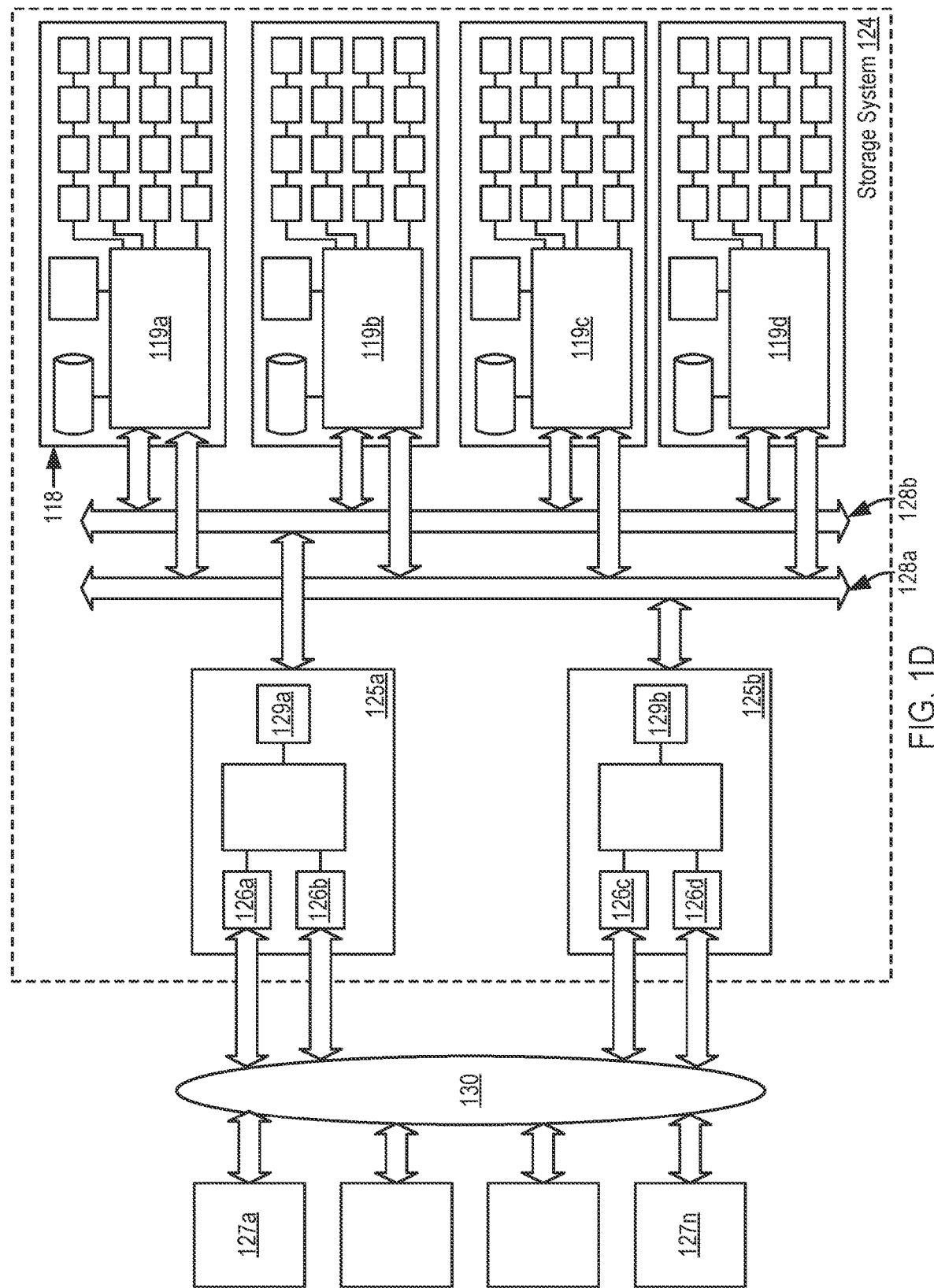
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage devices 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
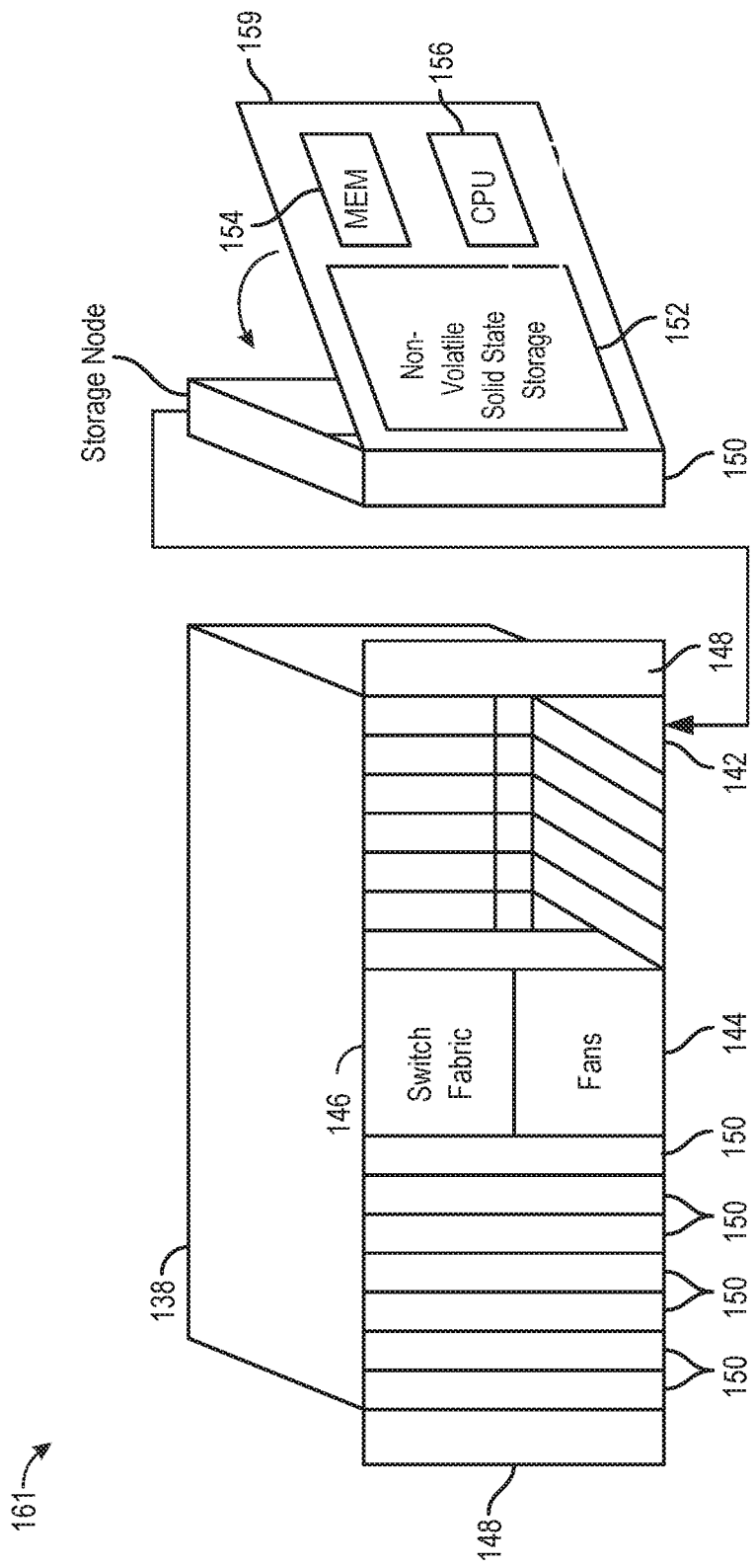
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
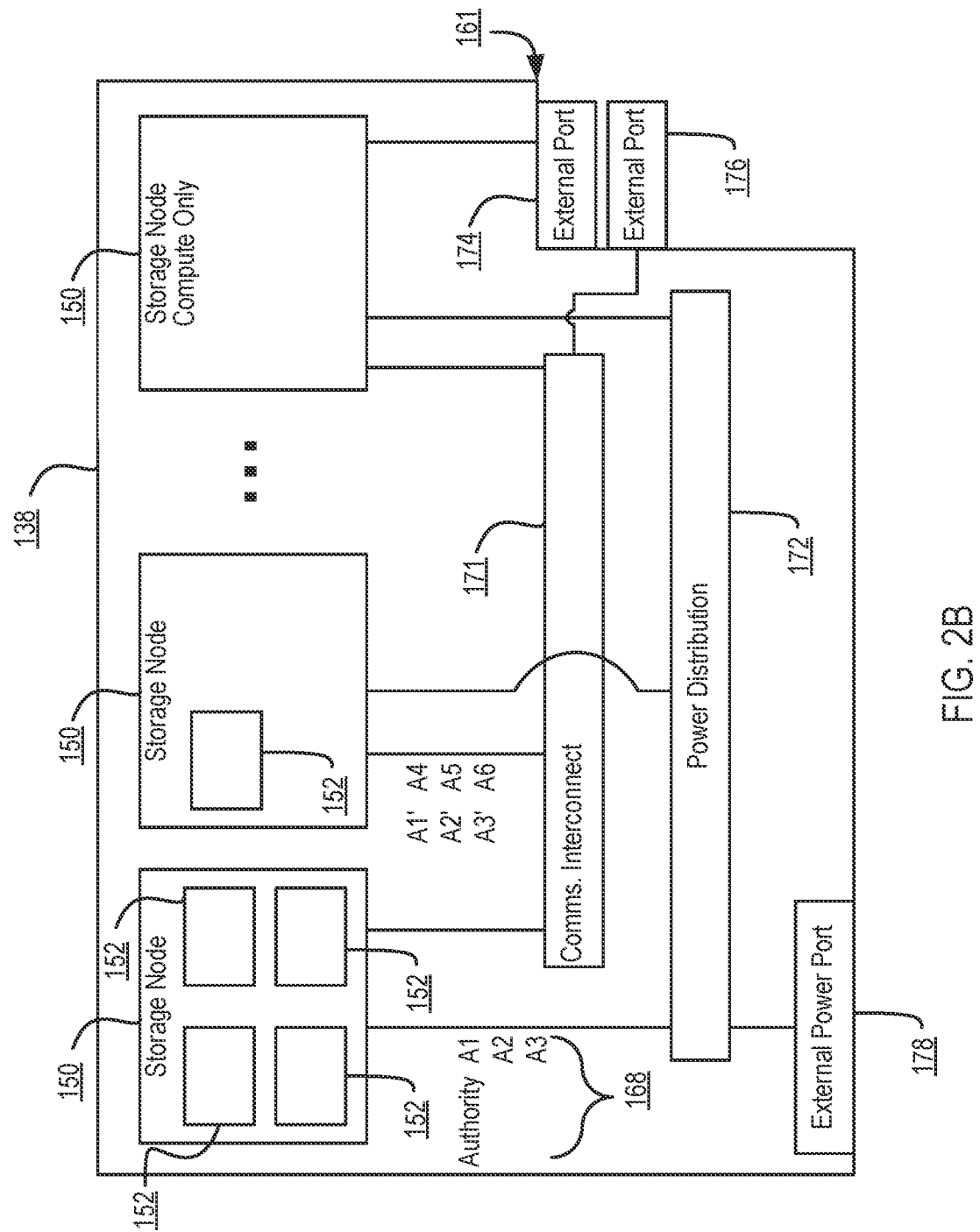
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In embodiments, authorities 168 operate to determine how operations will proceed against particular logical elements. Each of the logical elements may be operated on through a particular authority across a plurality of storage controllers of a storage system. The authorities 168 may communicate with the plurality of storage controllers so that the plurality of storage controllers collectively perform operations against those particular logical elements.

In embodiments, logical elements could be, for example, files, directories, object buckets, individual objects, delineated parts of files or objects, other forms of key-value pair databases, or tables. In embodiments, performing an operation can involve, for example, ensuring consistency, structural integrity, and/or recoverability with other operations against the same logical element, reading metadata and data associated with that logical element, determining what data should be written durably into the storage system to persist any changes for the operation, or where metadata and data can be determined to be stored across modular storage devices attached to a plurality of the storage controllers in the storage system.

In some embodiments the operations are token based transactions to efficiently communicate within a distributed system. Each transaction may be accompanied by or associated with a token, which gives permission to execute the transaction. The authorities 168 are able to maintain a pre-transaction state of the system until completion of the operation in some embodiments. The token based communication may be accomplished without a global lock across the system, and also enables restart of an operation in case of a disruption or other failure.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
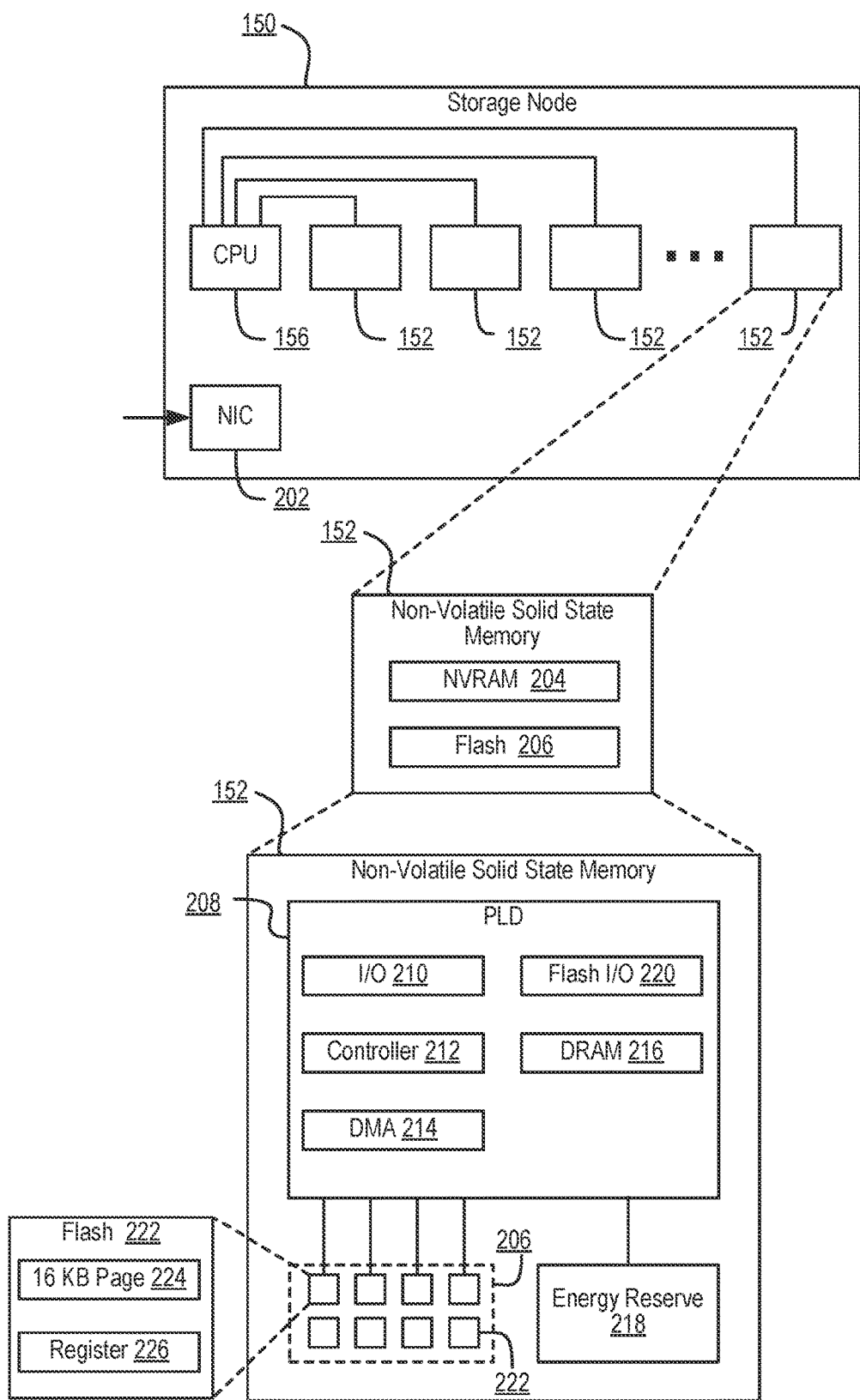
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from.

Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., an FPGA. In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
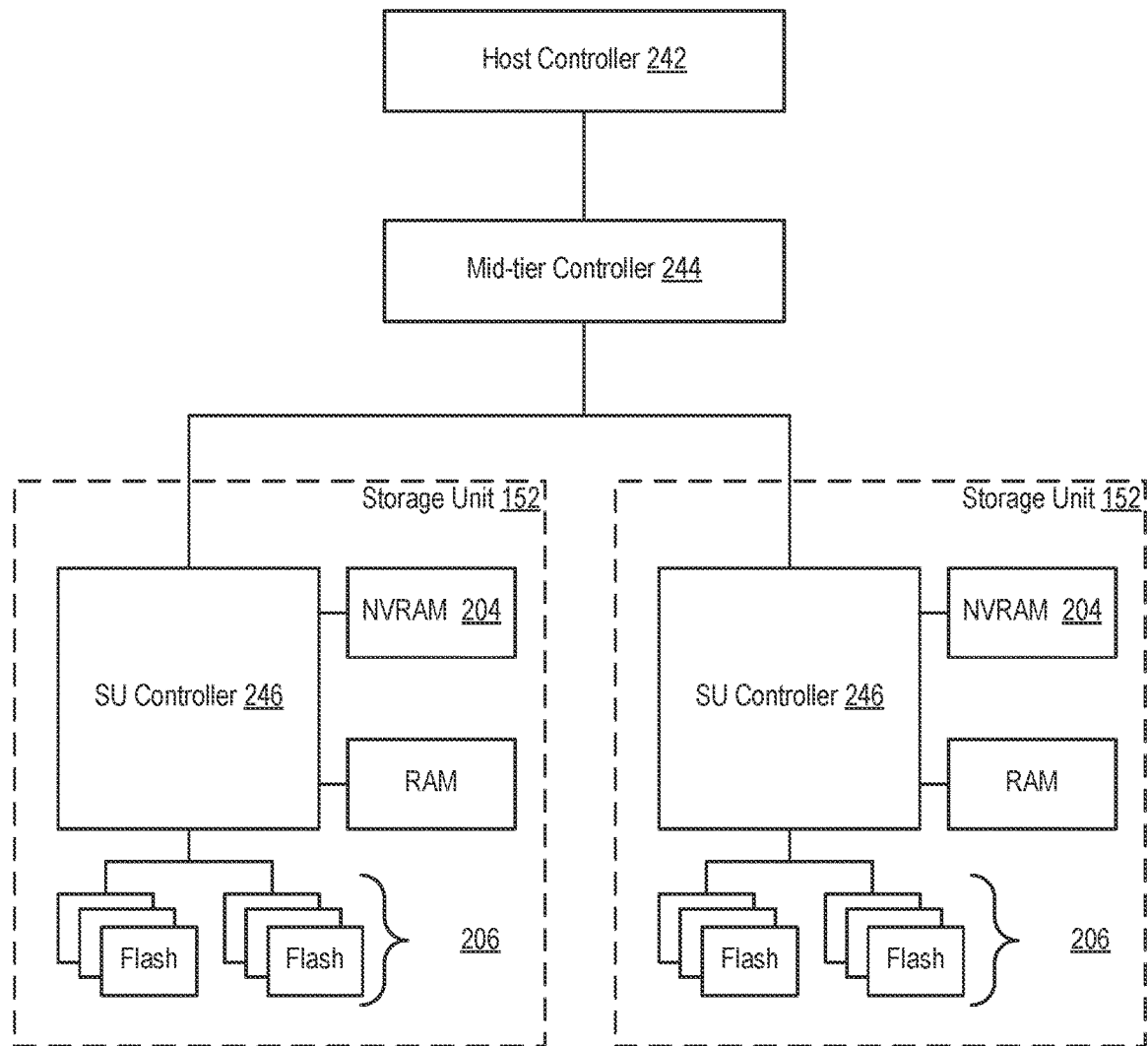
FIG. 2D shows a storage server environment, which uses embodiments of the storage nodes and storage units of some previous figures in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA, flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
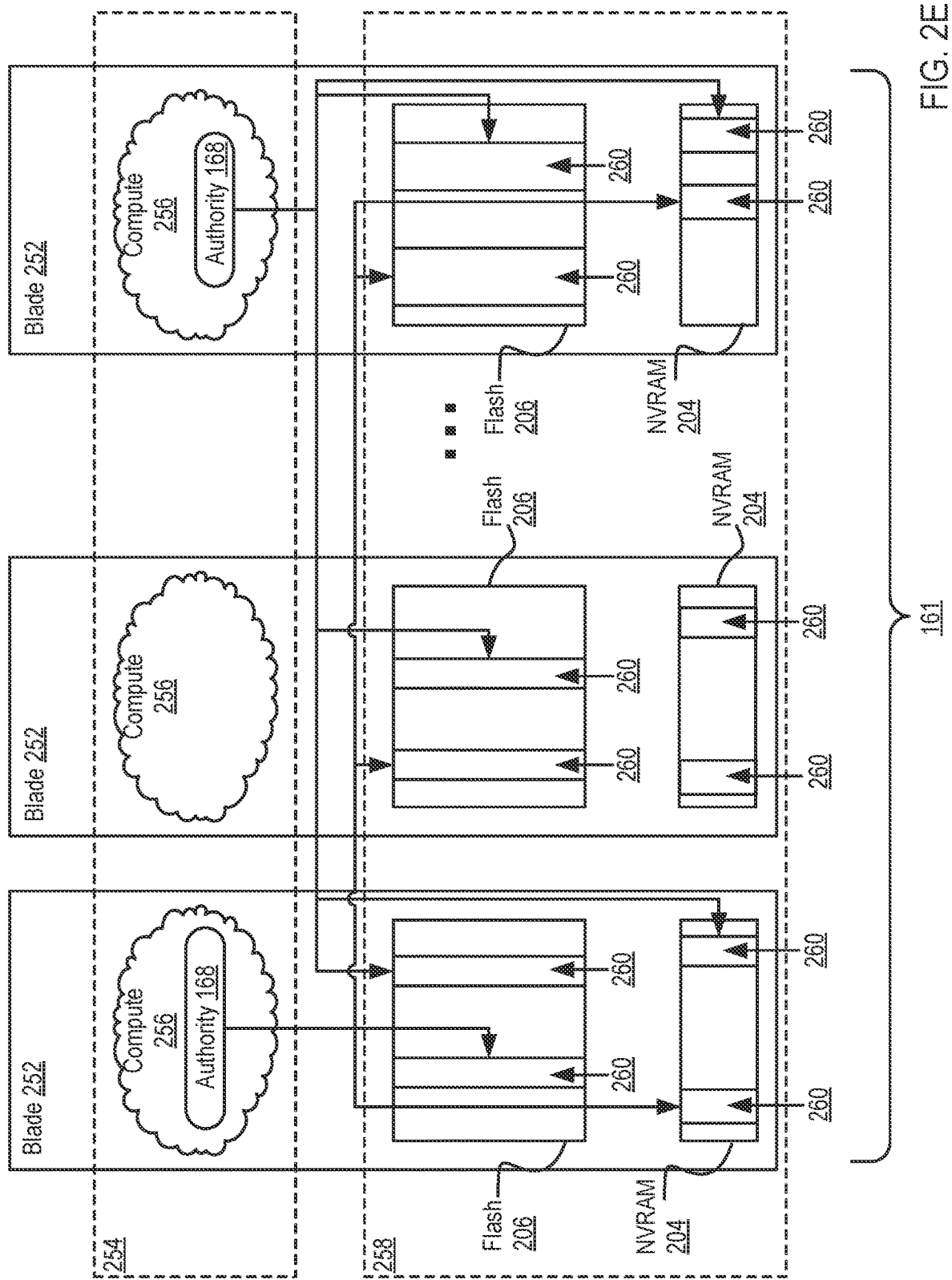
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g. partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
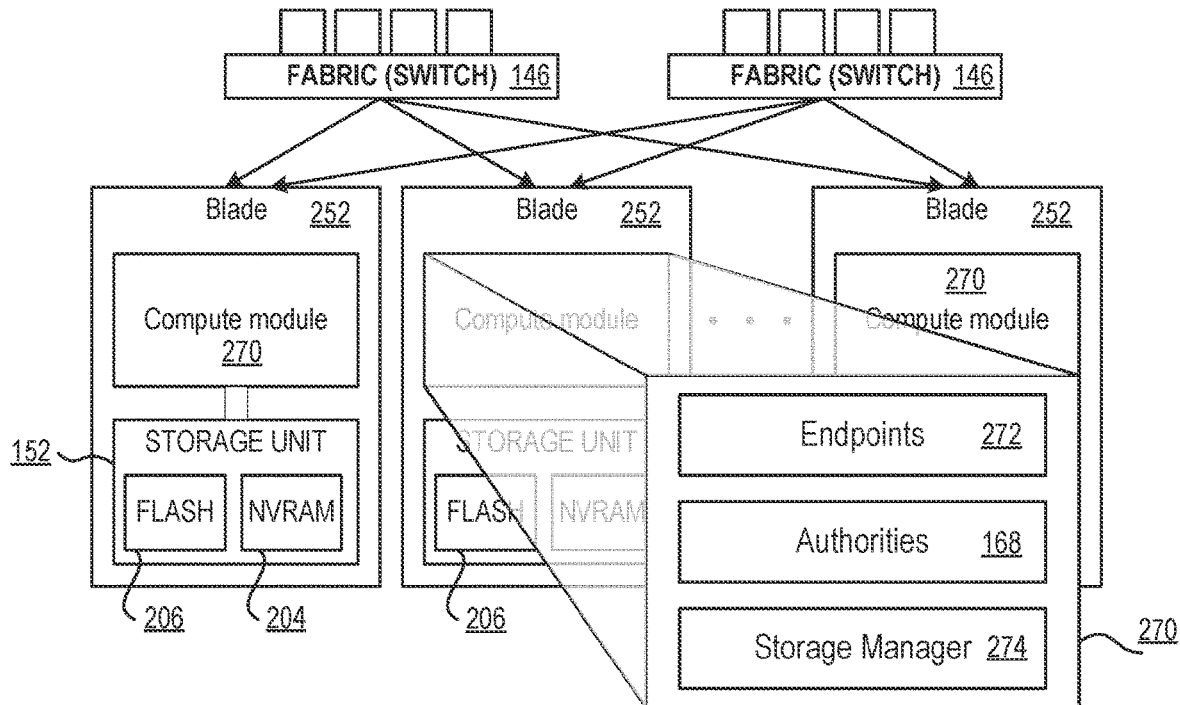
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
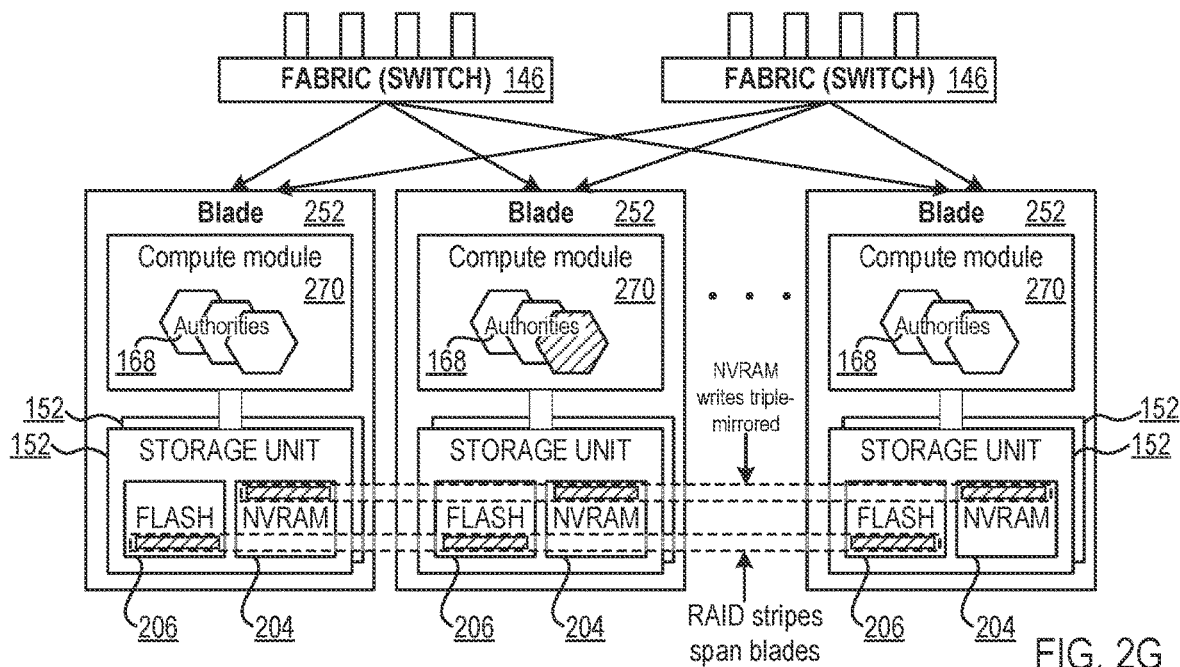
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers' 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
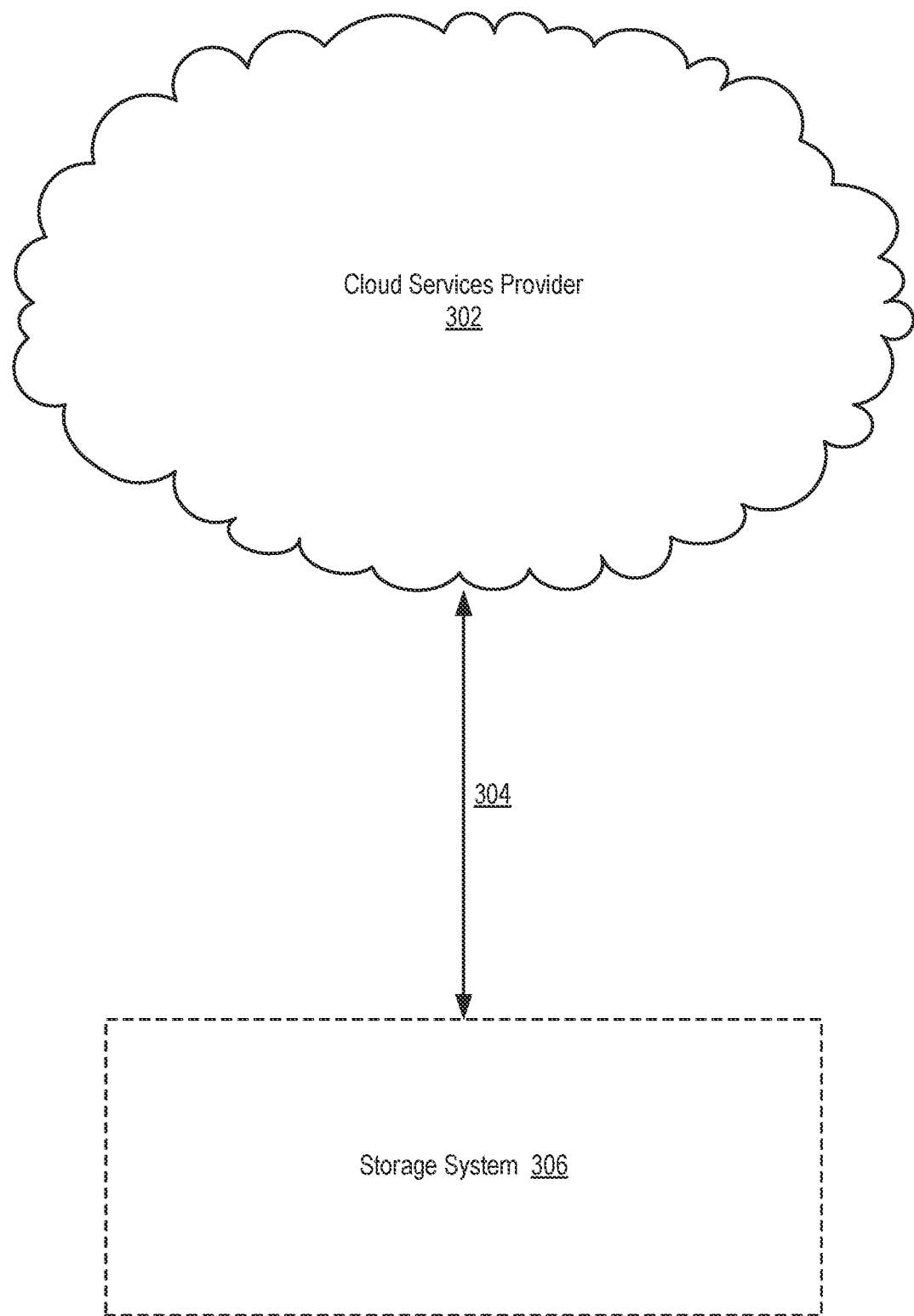
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or LAN, or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides a vast array of services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 302 offers access to its storage infrastructure for use by the storage system 306 and users of the storage system 306, and so on. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. In still alternative embodiments, the cloud services provider 302 may be embodied as a mix of a private and public cloud services with a hybrid cloud deployment.

Although not explicitly depicted in FIG. 3A, readers will appreciate that a vast amount of additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model, eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive vast amounts of telemetry data phoned home by the storage system 306. Such telemetry data may describe various operating characteristics of the storage system 306 and may be analyzed for a vast array of purposes including, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Although the example depicted in FIG. 3A illustrates the storage system 306 being coupled for data communications with the cloud services provider 302, in other embodiments the storage system 306 may be part of a hybrid cloud deployment in which private cloud elements (e.g., private cloud services, on-premises infrastructure, and so on) and public cloud elements (e.g., public cloud services, infrastructure, and so on that may be provided by one or more cloud services providers) are combined to form a single solution, with orchestration among the various platforms. Such a hybrid cloud deployment may leverage hybrid cloud management software such as, for example, Azure™ Arc from Microsoft™, that centralize the management of the hybrid cloud deployment to any infrastructure and enable the deployment of services anywhere. In such an example, the hybrid cloud management software may be configured to create, update, and delete resources (both physical and virtual) that form the hybrid cloud deployment, to allocate compute and storage to specific workloads, to monitor workloads and resources for performance, policy compliance, updates and patches, security status, or to perform a variety of other tasks.

Readers will appreciate that by pairing the storage systems described herein with one or more cloud services providers, various offerings may be enabled. For example, disaster recovery as a service ('DRaaS') may be provided where cloud resources are utilized to protect applications and data from disruption caused by disaster, including in embodiments where the storage systems may serve as the primary data store. In such embodiments, a total system backup may be taken that allows for business continuity in the event of system failure. In such embodiments, cloud data backup techniques (by themselves or as part of a larger DRaaS solution) may also be integrated into an overall solution that includes the storage systems and cloud services providers described herein.

The storage systems described herein, as well as the cloud services providers, may be utilized to provide a wide array of security features. For example, the storage systems may encrypt data at rest (and data may be sent to and from the storage systems encrypted) and may make use of Key Management-as-a-Service ('KMaaS') to manage encryption keys, keys for locking and unlocking storage devices, and so on. Likewise, cloud data security gateways or similar mechanisms may be utilized to ensure that data stored within the storage systems does not improperly end up being stored in the cloud as part of a cloud data backup operation. Furthermore, microsegmentation or identity-based-segmentation may be utilized in a data center that includes the storage systems or within the cloud services provider, to create secure zones in data centers and cloud deployments that enables the isolation of workloads from one another.

Figure 3B:
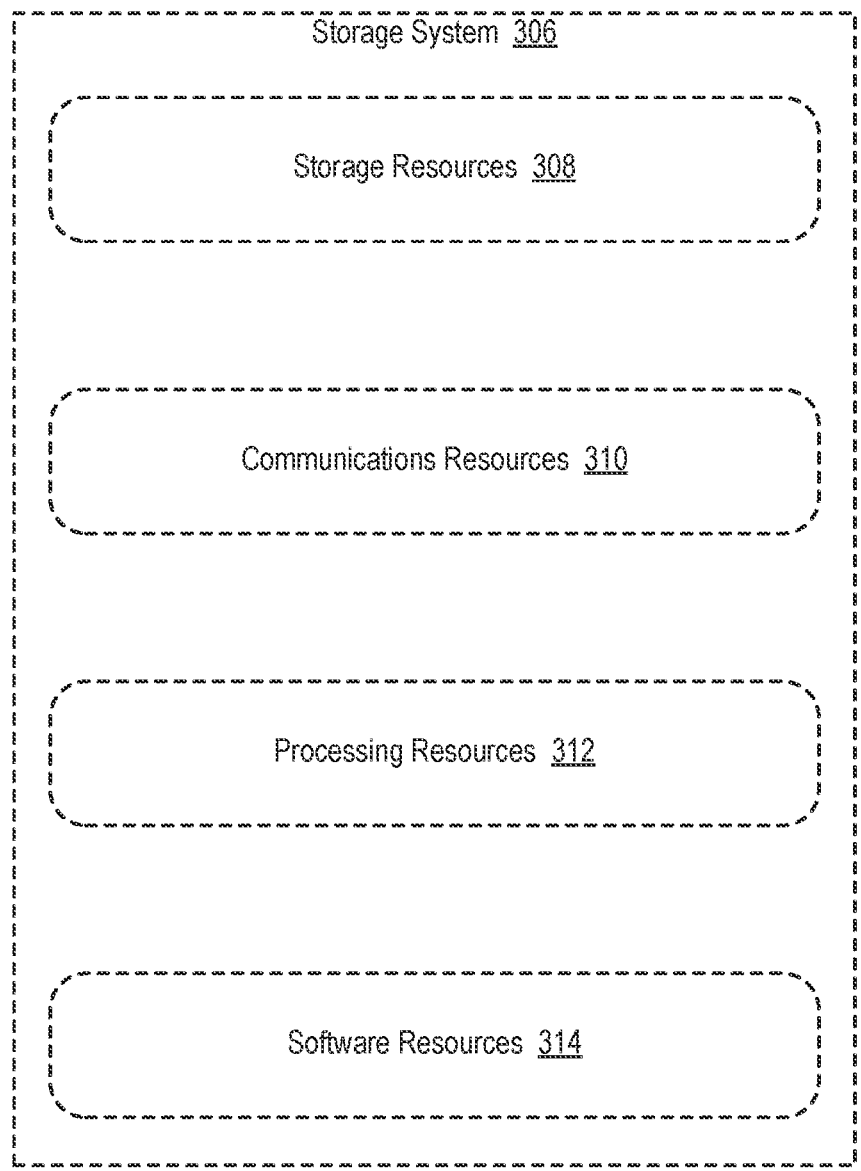
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include a vast amount of storage resources 308, which may be embodied in many forms. For example, the storage resources 308 can include nano-RAM or another form of nonvolatile random access memory that utilizes carbon nanotubes deposited on a substrate, 3D crosspoint nonvolatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 308 may include non-volatile magnetoresistive random-access memory ('MRAM'), including spin transfer torque ('STT') MRAM. The example storage resources 308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The storage resources 308 depicted in FIG. 3B may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The storage resources 308 depicted in FIG. 3B may also include racetrack memory (also referred to as domain-wall memory). Such racetrack memory may be embodied as a form of non-volatile, solid-state memory that relies on the intrinsic strength and orientation of the magnetic field created by an electron as it spins in addition to its electronic charge, in solid-state devices. Through the use of spin-coherent electric current to move magnetic domains along a nanoscopic permalloy wire, the domains may pass by magnetic read/write heads positioned near the wire as current is passed through the wire, which alter the domains to record patterns of bits. In order to create a racetrack memory device, many such wires and read/write elements may be packaged together.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The example storage system 306 depicted in FIG. 3B may leverage the storage resources described above in a variety of different ways. For example, some portion of the storage resources may be utilized to serve as a write cache where data is initially written to storage resources with relatively fast write latencies, relatively high write bandwidth, or similar characteristics. In such an example, data that is written to the storage resources that serve as a write cache may later be written to other storage resources that may be characterized by slower write latencies, lower write bandwidth, or similar characteristics than the storage resources that are utilized to serve as a write cache. In a similar manner, storage resources within the storage system may be utilized as a read cache, where the read cache is populated in accordance with a set of predetermined rules or heuristics. In other embodiments, tiering may be achieved within the storage systems by placing data within the storage system in accordance with one or more policies such that, for example, data that is accessed frequently is stored in faster storage tiers while data that is accessed infrequently is stored in slower storage tiers.

The storage system 306 depicted in FIG. 3B also includes communications resources 310 that may be useful in facilitating data communications between components within the storage system 306, as well as data communications between the storage system 306 and computing devices that are outside of the storage system 306, including embodiments where those resources are separated by a relatively vast expanse. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more ASICs that are customized for some particular purpose as well as one or more CPUs. The processing resources 312 may also include one or more DSPs, one or more FPGAs, one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform a vast array of tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Figure 3C:
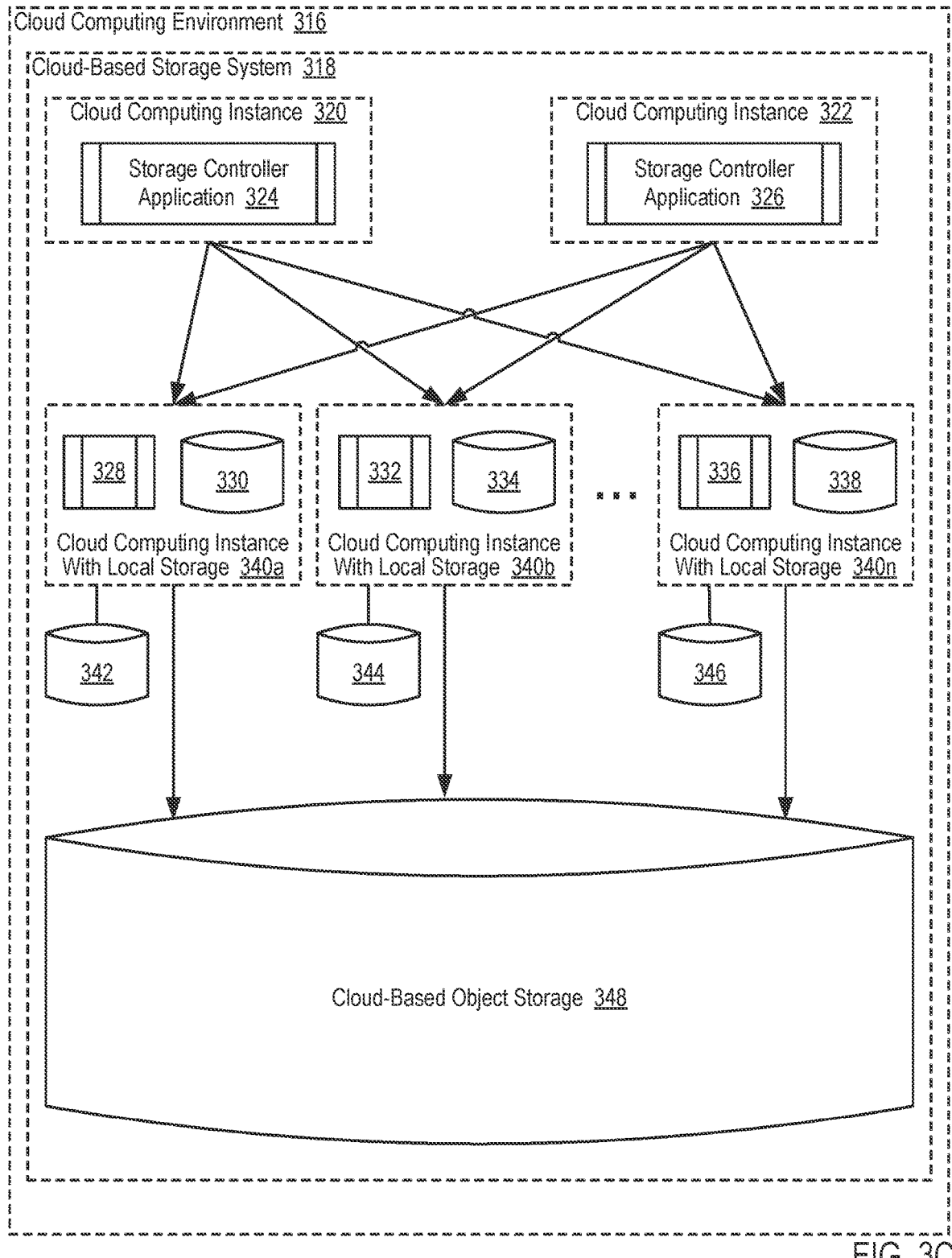
FIG. 3C sets forth an example of a cloud-based storage system in accordance with some embodiments of the present disclosure.

For further explanation, FIG. 3C sets forth an example of a cloud-based storage system 318 in accordance with some embodiments of the present disclosure. In the example depicted in FIG. 3C, the cloud-based storage system 318 is created entirely in a cloud computing environment 316 such as, for example, Amazon Web Services ('AWS'), Microsoft Azure, Google Cloud Platform, IBM Cloud, Oracle Cloud, and others. The cloud-based storage system 318 may be used to provide services similar to the services that may be provided by the storage systems described above. For example, the cloud-based storage system 318 may be used to provide block storage services to users of the cloud-based storage system 318, the cloud-based storage system 318 may be used to provide storage services to users of the cloud-based storage system 318 through the use of solid-state storage, and so on.

The cloud-based storage system 318 depicted in FIG. 3C includes two cloud computing instances 320, 322 that each are used to support the execution of a storage controller application 324, 326. The cloud computing instances 320, 322 may be embodied, for example, as instances of cloud computing resources (e.g., virtual machines) that may be provided by the cloud computing environment 316 to support the execution of software applications such as the storage controller application 324, 326. In one embodiment, the cloud computing instances 320, 322 may be embodied as Amazon Elastic Compute Cloud ('EC2') instances. In such an example, an Amazon Machine Image ('AMI') that includes the storage controller application 324, 326 may be booted to create and configure a virtual machine that may execute the storage controller application 324, 326.

In the example method depicted in FIG. 3C, the storage controller application 324, 326 may be embodied as a module of computer program instructions that, when executed, carries out various storage tasks. For example, the storage controller application 324, 326 may be embodied as a module of computer program instructions that, when executed, carries out the same tasks as the controllers 110A, 110B in FIG. 1A described above such as writing data received from the users of the cloud-based storage system 318 to the cloud-based storage system 318, erasing data from the cloud-based storage system 318, retrieving data from the cloud-based storage system 318 and providing such data to users of the cloud-based storage system 318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 320, 322 that each include the storage controller application 324, 326, in some embodiments one cloud computing instance 320 may operate as the primary controller as described above while the other cloud computing instance 322 may operate as the secondary controller as described above. Readers will appreciate that the storage controller application 324, 326 depicted in FIG. 3C may include identical source code that is executed within different cloud computing instances 320, 322.

Consider an example in which the cloud computing environment 316 is embodied as AWS and the cloud computing instances are embodied as EC2 instances. In such an example, the cloud computing instance 320 that operates as the primary controller may be deployed on one of the instance types that has a relatively large amount of memory and processing power while the cloud computing instance 322 that operates as the secondary controller may be deployed on one of the instance types that has a relatively small amount of memory and processing power. In such an example, upon the occurrence of a failover event where the roles of primary and secondary are switched, a double failover may actually be carried out such that: 1) a first failover event where the cloud computing instance 322 that formerly operated as the secondary controller begins to operate as the primary controller, and 2) a third cloud computing instance (not shown) that is of an instance type that has a relatively large amount of memory and processing power is spun up with a copy of the storage controller application, where the third cloud computing instance begins operating as the primary controller while the cloud computing instance 322 that originally operated as the secondary controller begins operating as the secondary controller again. In such an example, the cloud computing instance 320 that formerly operated as the primary controller may be terminated. Readers will appreciate that in alternative embodiments, the cloud computing instance 320 that is operating as the secondary controller after the failover event may continue to operate as the secondary controller and the cloud computing instance 322 that operated as the primary controller after the occurrence of the failover event may be terminated once the primary role has been assumed by the third cloud computing instance (not shown).

Readers will appreciate that while the embodiments described above relate to embodiments where one cloud computing instance 320 operates as the primary controller and the second cloud computing instance 322 operates as the secondary controller, other embodiments are within the scope of the present disclosure. For example, each cloud computing instance 320, 322 may operate as a primary controller for some portion of the address space supported by the cloud-based storage system 318, each cloud computing instance 320, 322 may operate as a primary controller where the servicing of I/O operations directed to the cloud-based storage system 318 are divided in some other way, and so on. In fact, in other embodiments where costs savings may be prioritized over performance demands, only a single cloud computing instance may exist that contains the storage controller application.

The cloud-based storage system 318 depicted in FIG. 3C includes cloud computing instances 340*a*, 340*b*, 340*n* with local storage 330, 334, 338. The cloud computing instances 340*a*, 340*b*, 340*n* depicted in FIG. 3C may be embodied, for example, as instances of cloud computing resources that may be provided by the cloud computing environment 316 to support the execution of software applications. The cloud computing instances 340*a*, 340*b*, 340*n* of FIG. 3C may differ from the cloud computing instances 320, 322 described above as the cloud computing instances 340*a*, 340*b*, 340*n* of FIG. 3C have local storage 330, 334, 338 resources whereas the cloud computing instances 320, 322 that support the execution of the storage controller application 324, 326 need not have local storage resources. The cloud computing instances 340*a*, 340*b*, 340*n* with local storage 330, 334, 338 may be embodied, for example, as EC2 M5 instances that include one or more SSDs, as EC2 R5 instances that include one or more SSDs, as EC2 I3 instances that include one or more SSDs, and so on. In some embodiments, the local storage 330, 334, 338 must be embodied as solid-state storage (e.g., SSDs) rather than storage that makes use of hard disk drives.

In the example depicted in FIG. 3C, each of the cloud computing instances 340*a*, 340*b*, 340*n* with local storage 330, 334, 338 can include a software daemon 328, 332, 336 that, when executed by a cloud computing instance 340*a*, 340*b*, 340*n* can present itself to the storage controller applications 324, 326 as if the cloud computing instance 340*a*, 340*b*, 340*n* were a physical storage device (e.g., one or more SSDs). In such an example, the software daemon 328, 332, 336 may include computer program instructions similar to those that would normally be contained on a storage device such that the storage controller applications 324, 326 can send and receive the same commands that a storage controller would send to storage devices. In such a way, the storage controller applications 324, 326 may include code that is identical to (or substantially identical to) the code that would be executed by the controllers in the storage systems described above. In these and similar embodiments, communications between the storage controller applications 324, 326 and the cloud computing instances 340*a*, 340*b*, 340*n* with local storage 330, 334, 338 may utilize iSCSI, NVMe over TCP, messaging, a custom protocol, or in some other mechanism.

In the example depicted in FIG. 3C, each of the cloud computing instances 340*a*, 340*b*, 340*n* with local storage 330, 334, 338 may also be coupled to block-storage 342, 344, 346 that is offered by the cloud computing environment 316. The block-storage 342, 344, 346 that is offered by the cloud computing environment 316 may be embodied, for example, as Amazon Elastic Block Store ('EBS') volumes. For example, a first EBS volume may be coupled to a first cloud computing instance 340*a*, a second EBS volume may be coupled to a second cloud computing instance 340*b*, and a third EBS volume may be coupled to a third cloud computing instance 340*n*. In such an example, the block-storage 342, 344, 346 that is offered by the cloud computing environment 316 may be utilized in a manner that is similar to how the NVRAM devices described above are utilized, as the software daemon 328, 332, 336 (or some other module) that is executing within a particular cloud comping instance 340*a*, 340*b*, 340*n* may, upon receiving a request to write data, initiate a write of the data to its attached EBS volume as well as a write of the data to its local storage 330, 334, 338 resources. In some alternative embodiments, data may only be written to the local storage 330, 334, 338 resources within a particular cloud comping instance 340*a*, 340*b*, 340*n*. In an alternative embodiment, rather than using the block-storage 342, 344, 346 that is offered by the cloud computing environment 316 as NVRAM, actual RAM on each of the cloud computing instances 340*a*, 340*b*, 340*n* with local storage 330, 334, 338 may be used as NVRAM, thereby decreasing network utilization costs that would be associated with using an EBS volume as the NVRAM.

In the example depicted in FIG. 3C, the cloud computing instances 340*a*, 340*b*, 340*n* with local storage 330, 334, 338 may be utilized, by cloud computing instances 320, 322 that support the execution of the storage controller application 324, 326 to service I/O operations that are directed to the cloud-based storage system 318. Consider an example in which a first cloud computing instance 320 that is executing the storage controller application 324 is operating as the primary controller. In such an example, the first cloud computing instance 320 that is executing the storage controller application 324 may receive (directly or indirectly via the secondary controller) requests to write data to the cloud-based storage system 318 from users of the cloud-based storage system 318. In such an example, the first cloud computing instance 320 that is executing the storage controller application 324 may perform various tasks such as, for example, deduplicating the data contained in the request, compressing the data contained in the request, determining where to the write the data contained in the request, and so on, before ultimately sending a request to write a deduplicated, encrypted, or otherwise possibly updated version of the data to one or more of the cloud computing instances 340a, 340b, 340n with local storage 330, 334, 338. Either cloud computing instance 320, 322, in some embodiments, may receive a request to read data from the cloud-based storage system 318 and may ultimately send a request to read data to one or more of the cloud computing instances 340a, 340b, 340n with local storage 330, 334, 338.

Readers will appreciate that when a request to write data is received by a particular cloud computing instance 340a, 340b, 340n with local storage 330, 334, 338, the software daemon 328, 332, 336 or some other module of computer program instructions that is executing on the particular cloud computing instance 340a, 340b, 340n may be configured to not only write the data to its own local storage 330, 334, 338 resources and any appropriate block-storage 342, 344, 346 that are offered by the cloud computing environment 316, but the software daemon 328, 332, 336 or some other module of computer program instructions that is executing on the particular cloud computing instance 340a, 340b, 340n may also be configured to write the data to cloud-based object storage 348 that is attached to the particular cloud computing instance 340a, 340b, 340n. The cloud-based object storage 348 that is attached to the particular cloud computing instance 340a, 340b, 340n may be embodied, for example, as Amazon Simple Storage Service ('S3') storage that is accessible by the particular cloud computing instance 340a, 340b, 340n. In other embodiments, the cloud computing instances 320, 322 that each include the storage controller application 324, 326 may initiate the storage of the data in the local storage 330, 334, 338 of the cloud computing instances 340a, 340b, 340n and the cloud-based object storage 348.

Readers will appreciate that, as described above, the cloud-based storage system 318 may be used to provide block storage services to users of the cloud-based storage system 318. While the local storage 330, 334, 338 resources and the block-storage 342, 344, 346 resources that are utilized by the cloud computing instances 340a, 340b, 340n may support block-level access, the cloud-based object storage 348 that is attached to the particular cloud computing instance 340a, 340b, 340n supports only object-based access. In order to address this, the software daemon 328, 332, 336 or some other module of computer program instructions that is executing on the particular cloud computing instance 340a, 340b, 340n may be configured to take blocks of data, package those blocks into objects, and write the objects to the cloud-based object storage 348 that is attached to the particular cloud computing instance 340a, 340b, 340n.

Consider an example in which data is written to the local storage 330, 334, 338 resources and the block-storage 342, 344, 346 resources that are utilized by the cloud computing instances 340a, 340b, 340n in 1 MB blocks. In such an example, assume that a user of the cloud-based storage system 318 issues a request to write data that, after being compressed and deduplicated by the storage controller application 324, 326 results in the need to write 5 MB of data. In such an example, writing the data to the local storage 330, 334, 338 resources and the block-storage 342, 344, 346 resources that are utilized by the cloud computing instances 340a, 340b, 340n is relatively straightforward as 5 blocks that are 1 MB in size are written to the local storage 330, 334, 338 resources and the block-storage 342, 344, 346 resources that are utilized by the cloud computing instances 340a, 340b, 340n. In such an example, the software daemon 328, 332, 336 or some other module of computer program instructions that is executing on the particular cloud computing instance 340a, 340b, 340n may be configured to: 1) create a first object that includes the first 1 MB of data and write the first object to the cloud-based object storage 348, 2) create a second object that includes the second 1 MB of data and write the second object to the cloud-based object storage 348, 3) create a third object that includes the third 1 MB of data and write the third object to the cloud-based object storage 348, and so on. As such, in some embodiments, each object that is written to the cloud-based object storage 348 may be identical (or nearly identical) in size. Readers will appreciate that in such an example, metadata that is associated with the data itself may be included in each object (e.g., the first 1 MB of the object is data and the remaining portion is metadata associated with the data).

Readers will appreciate that the cloud-based object storage 348 may be incorporated into the cloud-based storage system 318 to increase the durability of the cloud-based storage system 318. Continuing with the example described above where the cloud computing instances 340a, 340b, 340n are EC2 instances, readers will understand that EC2 instances are only guaranteed to have a monthly uptime of 99.9% and data stored in the local instance store only persists during the lifetime of the EC2 instance. As such, relying on the cloud computing instances 340a, 340b, 340n with local storage 330, 334, 338 as the only source of persistent data storage in the cloud-based storage system 318 may result in a relatively unreliable storage system. Likewise, EBS volumes are designed for 99.999% availability. As such, even relying on EBS as the persistent data store in the cloud-based storage system 318 may result in a storage system that is not sufficiently durable. Amazon S3, however, is designed to provide 99.999999999% durability, meaning that a cloud-based storage system 318 that can incorporate S3 into its pool of storage is substantially more durable than various other options.

Readers will appreciate that while a cloud-based storage system 318 that can incorporate S3 into its pool of storage is substantially more durable than various other options, utilizing S3 as the primary pool of storage may result in storage system that has relatively slow response times and relatively long I/O latencies. As such, the cloud-based storage system 318 depicted in FIG. 3C not only stores data in S3 but the cloud-based storage system 318 also stores data in local storage 330, 334, 338 resources and block-storage 342, 344, 346 resources that are utilized by the cloud computing instances 340a, 340b, 340n, such that read operations can be serviced from local storage 330, 334, 338 resources and the block-storage 342, 344, 346 resources that are utilized by the cloud computing instances 340a, 340b, 340n, thereby reducing read latency when users of the cloud-based storage system 318 attempt to read data from the cloud-based storage system 318.

In some embodiments, all data that is stored by the cloud-based storage system 318 may be stored in both: 1) the cloud-based object storage 348, and 2) at least one of the local storage 330, 334, 338 resources or block-storage 342, 344, 346 resources that are utilized by the cloud computing instances 340a, 340b, 340n. In such embodiments, the local storage 330, 334, 338 resources and block-storage 342, 344, 346 resources that are utilized by the cloud computing instances 340a, 340b, 340n may effectively operate as cache that generally includes all data that is also stored in S3, such that all reads of data may be serviced by the cloud computing instances 340a, 340b, 340n without requiring the cloud computing instances 340a, 340b, 340n to access the cloud-based object storage 348. Readers will appreciate that in other embodiments, however, all data that is stored by the cloud-based storage system 318 may be stored in the cloud-based object storage 348, but less than all data that is stored by the cloud-based storage system 318 may be stored in at least one of the local storage 330, 334, 338 resources or block-storage 342, 344, 346 resources that are utilized by the cloud computing instances 340a, 340b, 340n. In such an example, various policies may be utilized to determine which subset of the data that is stored by the cloud-based storage system 318 should reside in both: 1) the cloud-based object storage 348, and 2) at least one of the local storage 330, 334, 338 resources or block-storage 342, 344, 346 resources that are utilized by the cloud computing instances 340a, 340b, 340n.

As described above, when the cloud computing instances 340a, 340b, 340n with local storage 330, 334, 338 are embodied as EC2 instances, the cloud computing instances 340a, 340b, 340n with local storage 330, 334, 338 are only guaranteed to have a monthly uptime of 99.90% and data stored in the local instance store only persists during the lifetime of each cloud computing instance 340a, 340b, 340n with local storage 330, 334, 338. As such, one or more modules of computer program instructions that are executing within the cloud-based storage system 318 (e.g., a monitoring module that is executing on its own EC2 instance) may be designed to handle the failure of one or more of the cloud computing instances 340a, 340b, 340n with local storage 330, 334, 338. In such an example, the monitoring module may handle the failure of one or more of the cloud computing instances 340a, 340b, 340n with local storage 330, 334, 338 by creating one or more new cloud computing instances with local storage, retrieving data that was stored on the failed cloud computing instances 340a, 340b, 340n from the cloud-based object storage 348, and storing the data retrieved from the cloud-based object storage 348 in local storage on the newly created cloud computing instances. Readers will appreciate that many variants of this process may be implemented.

Consider an example in which all cloud computing instances 340a, 340b, 340n with local storage 330, 334, 338 failed. In such an example, the monitoring module may create new cloud computing instances with local storage, where high-bandwidth instances types are selected that allow for the maximum data transfer rates between the newly created high-bandwidth cloud computing instances with local storage and the cloud-based object storage 348. Readers will appreciate that instances types are selected that allow for the maximum data transfer rates between the new cloud computing instances and the cloud-based object storage 348 such that the new high-bandwidth cloud computing instances can be rehydrated with data from the cloud-based object storage 348 as quickly as possible. Once the new high-bandwidth cloud computing instances are rehydrated with data from the cloud-based object storage 348, less expensive lower-bandwidth cloud computing instances may be created, data may be migrated to the less expensive lower-bandwidth cloud computing instances, and the high-bandwidth cloud computing instances may be terminated.

Readers will appreciate that in some embodiments, the number of new cloud computing instances that are created may substantially exceed the number of cloud computing instances that are needed to locally store all of the data stored by the cloud-based storage system 318. The number of new cloud computing instances that are created may substantially exceed the number of cloud computing instances that are needed to locally store all of the data stored by the cloud-based storage system 318 in order to more rapidly pull data from the cloud-based object storage 348 and into the new cloud computing instances, as each new cloud computing instance can (in parallel) retrieve some portion of the data stored by the cloud-based storage system 318. In such embodiments, once the data stored by the cloud-based storage system 318 has been pulled into the newly created cloud computing instances, the data may be consolidated within a subset of the newly created cloud computing instances and those newly created cloud computing instances that are excessive may be terminated.

Consider an example in which 1000 cloud computing instances are needed in order to locally store all valid data that users of the cloud-based storage system 318 have written to the cloud-based storage system 318. In such an example, assume that all 1,000 cloud computing instances fail. In such an example, the monitoring module may cause 100,000 cloud computing instances to be created, where each cloud computing instance is responsible for retrieving, from the cloud-based object storage 348, distinct 1/100,000th chunks of the valid data that users of the cloud-based storage system 318 have written to the cloud-based storage system 318 and locally storing the distinct chunk of the dataset that it retrieved. In such an example, because each of the 100,000 cloud computing instances can retrieve data from the cloud-based object storage 348 in parallel, the caching layer may be restored 100 times faster as compared to an embodiment where the monitoring module only create 1000 replacement cloud computing instances. In such an example, over time the data that is stored locally in the 100,000 could be consolidated into 1,000 cloud computing instances and the remaining 99,000 cloud computing instances could be terminated.

Readers will appreciate that various performance aspects of the cloud-based storage system 318 may be monitored (e.g., by a monitoring module that is executing in an EC2 instance) such that the cloud-based storage system 318 can be scaled-up or scaled-out as needed. Consider an example in which the monitoring module monitors the performance of the could-based storage system 318 via communications with one or more of the cloud computing instances 320, 322 that each are used to support the execution of a storage controller application 324, 326, via monitoring communications between cloud computing instances 320, 322, 340a, 340b, 340n, via monitoring communications between cloud computing instances 320, 322, 340a, 340b, 340n and the cloud-based object storage 348, or in some other way. In such an example, assume that the monitoring module determines that the cloud computing instances 320, 322 that are used to support the execution of a storage controller application 324, 326 are undersized and not sufficiently servicing the I/O requests that are issued by users of the cloud-based storage system 318. In such an example, the monitoring module may create a new, more powerful cloud computing instance (e.g., a cloud computing instance of a type that includes more processing power, more memory, etc. . . . ) that includes the storage controller application such that the new, more powerful cloud computing instance can begin operating as the primary controller. Likewise, if the monitoring module determines that the cloud computing instances 320, 322 that are used to support the execution of a storage controller application 324, 326 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

Consider, as an additional example of dynamically sizing the cloud-based storage system 318, an example in which the monitoring module determines that the utilization of the local storage that is collectively provided by the cloud computing instances 340*a*, 340*b*, 340*n* has reached a predetermined utilization threshold (e.g., 95%). In such an example, the monitoring module may create additional cloud computing instances with local storage to expand the pool of local storage that is offered by the cloud computing instances. Alternatively, the monitoring module may create one or more new cloud computing instances that have larger amounts of local storage than the already existing cloud computing instances 340*a*, 340*b*, 340*n*, such that data stored in an already existing cloud computing instance 340*a*, 340*b*, 340*n* can be migrated to the one or more new cloud computing instances and the already existing cloud computing instance 340*a*, 340*b*, 340*n* can be terminated, thereby expanding the pool of local storage that is offered by the cloud computing instances. Likewise, if the pool of local storage that is offered by the cloud computing instances is unnecessarily large, data can be consolidated and some cloud computing instances can be terminated.

Readers will appreciate that the cloud-based storage system 318 may be sized up and down automatically by a monitoring module applying a predetermined set of rules that may be relatively simple of relatively complicated. In fact, the monitoring module may not only take into account the current state of the cloud-based storage system 318, but the monitoring module may also apply predictive policies that are based on, for example, observed behavior (e.g., every night from 10 PM until 6 AM usage of the storage system is relatively light), predetermined fingerprints (e.g., every time a virtual desktop infrastructure adds 100 virtual desktops, the number of IOPS directed to the storage system increase by X), and so on. In such an example, the dynamic scaling of the cloud-based storage system 318 may be based on current performance metrics, predicted workloads, and many other factors, including combinations thereof.

Readers will further appreciate that because the cloud-based storage system 318 may be dynamically scaled, the cloud-based storage system 318 may even operate in a way that is more dynamic. Consider the example of garbage collection. In a traditional storage system, the amount of storage is fixed. As such, at some point the storage system may be forced to perform garbage collection as the amount of available storage has become so constrained that the storage system is on the verge of running out of storage. In contrast, the cloud-based storage system 318 described here can always 'add' additional storage (e.g., by adding more cloud computing instances with local storage). Because the cloud-based storage system 318 described here can always 'add' additional storage, the cloud-based storage system 318 can make more intelligent decisions regarding when to perform garbage collection. For example, the cloud-based storage system 318 may implement a policy that garbage collection only be performed when the number of IOPS being serviced by the cloud-based storage system 318 falls below a certain level. In some embodiments, other system-level functions (e.g., deduplication, compression) may also be turned off and on in response to system load, given that the size of the cloud-based storage system 318 is not constrained in the same way that traditional storage systems are constrained.

Readers will appreciate that embodiments of the present disclosure resolve an issue with block-storage services offered by some cloud computing environments as some cloud computing environments only allow for one cloud computing instance to connect to a block-storage volume at a single time. For example, in Amazon AWS, only a single EC2 instance may be connected to an EBS volume. Through the use of EC2 instances with local storage, embodiments of the present disclosure can offer multi-connect capabilities where multiple EC2 instances can connect to another EC2 instance with local storage ('a drive instance'). In such embodiments, the drive instances may include software executing within the drive instance that allows the drive instance to support I/O directed to a particular volume from each connected EC2 instance. As such, some embodiments of the present disclosure may be embodied as multi-connect block storage services that may not include all of the components depicted in FIG. 3C.

In some embodiments, especially in embodiments where the cloud-based object storage 348 resources are embodied as Amazon S3, the cloud-based storage system 318 may include one or more modules (e.g., a module of computer program instructions executing on an EC2 instance) that are configured to ensure that when the local storage of a particular cloud computing instance is rehydrated with data from S3, the appropriate data is actually in S3. This issue arises largely because S3 implements an eventual consistency model where, when overwriting an existing object, reads of the object will eventually (but not necessarily immediately) become consistent and will eventually (but not necessarily immediately) return the overwritten version of the object. To address this issue, in some embodiments of the present disclosure, objects in S3 are never overwritten. Instead, a traditional 'overwrite' would result in the creation of the new object (that includes the updated version of the data) and the eventual deletion of the old object (that includes the previous version of the data).

In some embodiments of the present disclosure, as part of an attempt to never (or almost never) overwrite an object, when data is written to S3 the resultant object may be tagged with a sequence number. In some embodiments, these sequence numbers may be persisted elsewhere (e.g., in a database) such that at any point in time, the sequence number associated with the most up-to-date version of some piece of data can be known. In such a way, a determination can be made as to whether S3 has the most recent version of some piece of data by merely reading the sequence number associated with an object—and without actually reading the data from S3. The ability to make this determination may be particularly important when a cloud computing instance with local storage crashes, as it would be undesirable to rehydrate the local storage of a replacement cloud computing instance with out-of-date data. In fact, because the cloud-based storage system 318 does not need to access the data to verify its validity, the data can stay encrypted and access charges can be avoided.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 314 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described above may be useful for supporting various types of software applications. For example, the storage system 306 may be useful in supporting artificial intelligence ('AI') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation. Reinforcement learning may be employed to find the best possible behavior or path that a particular software application or machine should take in a specific situation. Reinforcement learning differs from other areas of machine learning (e.g., supervised learning, unsupervised learning) in that correct input/output pairs need not be presented for reinforcement learning and sub-optimal actions need not be explicitly corrected.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may be also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks, including the development of multi-layer neural networks, have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

In order for the storage systems described above to serve as a data hub or as part of an AI deployment, in some embodiments the storage systems may be configured to provide DMA between storage devices that are included in the storage systems and one or more GPUs that are used in an AI or big data analytics pipeline. The one or more GPUs may be coupled to the storage system, for example, via NVMe-over-Fabrics ('NVMe-oF') such that bottlenecks such as the host CPU can be bypassed and the storage system (or one of the components contained therein) can directly access GPU memory. In such an example, the storage systems may leverage API hooks to the GPUs to transfer data directly to the GPUs. For example, the GPUs may be embodied as Nvidia™ GPUs and the storage systems may support GPUDirect Storage ('GDS') software, or have similar proprietary software, that enables the storage system to transfer data to the GPUs via RDMA or similar mechanism. Readers will appreciate that in embodiments where the storage systems are embodied as cloud-based storage systems as described below, virtual drive or other components within such a cloud-based storage system may also be configured Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains. In addition to supporting the storage and use of blockchain technologies, the storage systems described above may also support the storage and use of derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available— including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain-computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming though the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

The storage systems described above may also be configured to implement NVMe Zoned Namespaces. Through the use of NVMe Zoned Namespaces, the logical address space of a namespace is divided into zones. Each zone provides a logical block address range that must be written sequentially and explicitly reset before rewriting, thereby enabling the creation of namespaces that expose the natural boundaries of the device and offload management of internal mapping tables to the host. In order to implement NVMe Zoned Name Spaces ('ZNS'), ZNS SSDs or some other form of zoned block devices may be utilized that expose a namespace logical address space using zones. With the zones aligned to the internal physical properties of the device, several inefficiencies in the placement of data can be eliminated. In such embodiments, each zone may be mapped, for example, to a separate application such that functions like wear levelling and garbage collection could be performed on a per-zone or per-application basis rather than across the entire device. In order to support ZNS, the storage controllers described herein may be configured with to interact with zoned block devices through the usage of, for example, the Linux™ kernel zoned block device interface or other tools.

The storage systems described above may also be configured to implement zoned storage in other ways such as, for example, through the usage of shingled magnetic recording (SMR) storage devices. In examples where zoned storage is used, device-managed embodiments may be deployed where the storage devices hide this complexity by managing it in the firmware, presenting an interface like any other storage device. Alternatively, zoned storage may be implemented via a host-managed embodiment that depends on the operating system to know how to handle the drive, and only write sequentially to certain regions of the drive. Zoned storage may similarly be implemented using a host-aware embodiment in which a combination of a drive managed and host managed implementation is deployed.

Figure 3D:
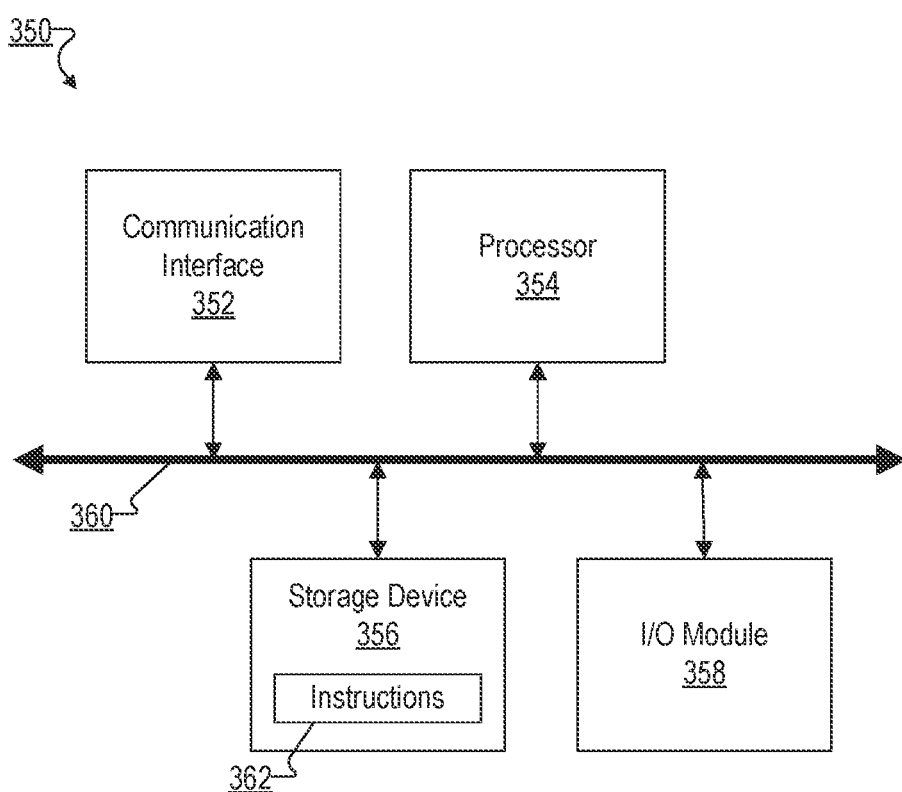
FIG. 3D illustrates an exemplary computing device that may be specifically configured to perform one or more of the processes described herein.

For further explanation, FIG. 3D illustrates an exemplary computing device 350 that may be specifically configured to perform one or more of the processes described herein. As shown in FIG. 3D, computing device 350 may include a communication interface 352, a processor 354, a storage device 356, and an input/output ("I/O") module 358 communicatively connected one to another via a communication infrastructure 360. While an exemplary computing device 350 is shown in FIG. 3D, the components illustrated in FIG. 3D are not intended to be limiting. Additional or alternative components may be used in other embodiments. Components of computing device 350 shown in FIG. 3D will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device. For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

The storage systems described above may, either alone or in combination, by configured to serve as a continuous data protection store. A continuous data protection store is a feature of a storage system that records updates to a dataset in such a way that consistent images of prior contents of the dataset can be accessed with a low time granularity (often on the order of seconds, or even less), and stretching back for a reasonable period of time (often hours or days). These allow access to very recent consistent points in time for the dataset, and also allow access to access to points in time for a dataset that might have just preceded some event that, for example, caused parts of the dataset to be corrupted or otherwise lost, while retaining close to the maximum number of updates that preceded that event. Conceptually, they are like a sequence of snapshots of a dataset taken very frequently and kept for a long period of time, though continuous data protection stores are often implemented quite differently from snapshots. A storage system implementing a data continuous data protection store may further provide a means of accessing these points in time, accessing one or more of these points in time as snapshots or as cloned copies, or reverting the dataset back to one of those recorded points in time.

Over time, to reduce overhead, some points in the time held in a continuous data protection store can be merged with other nearby points in time, essentially deleting some of these points in time from the store. This can reduce the capacity needed to store updates. It may also be possible to convert a limited number of these points in time into longer duration snapshots. For example, such a store might keep a low granularity sequence of points in time stretching back a few hours from the present, with some points in time merged or deleted to reduce overhead for up to an additional day. Stretching back in the past further than that, some of these points in time could be converted to snapshots representing consistent point-in-time images from only every few hours.

Although some embodiments are described largely in the context of a storage system, readers of skill in the art will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Advantages and features of the present disclosure can be further described by the following statements:

1. A method comprising: establishing, by an object retention management system, a retention policy for a bucket of an object-based storage system; detecting, by the object retention management system, an operation that causes an object to be stored within the bucket; and applying, by the object retention management system based on the detecting of the operation, the retention policy to the object, the retention policy preventing the object from being deleted or overwritten for a predefined time duration.

2. The method of any of the preceding statements, wherein: the operation is provided by a client of the object-based storage system; the predefined time duration is unmodifiable by a user associated with the client; and the predefined time duration is modifiable based on a predefined rule that is independent from a user action of the user, the predefined rule specifying a set of required authorizations by one or more authorized entities to modify the predefined time duration.

3. The method of any of the preceding statements, wherein: the retention policy specifies the predefined time duration based on one or more object attributes of the object.

4. The method of any of the preceding statements, wherein: the operation is provided by a client of the object-based storage system; the retention policy cannot be disabled for the bucket by a user associated with the client; and the retention policy can be disabled for the bucket based on a predefined rule that is independent from a user action of the user, the predefined rule specifying a set of required authorizations by one or more authorized entities to disable the retention policy for the bucket.

5. The method of any of the preceding statements, wherein the object comprises a first object version and a second object version, and wherein the applying the retention policy to the object includes: preventing the first object version from being deleted or overwritten during a first retention period associated with the first object version, the first retention period starting at a creation timestamp of the first object version and extending for the predefined time duration; and preventing the second object version from being deleted or overwritten during a second retention period associated with the second object version, the second retention period starting at a creation timestamp of the second object version and extending for the predefined time duration.

6. The method of any of the preceding statements, wherein the applying the retention policy to the object includes: determining that the first retention period associated with the first object version has ended; and allowing, in response to the determining that the first retention period associated with the first object version has ended, the first object version of the object to be deleted or overwritten.

7. The method of any of the preceding statements, wherein the applying the retention policy to the object includes: determining a latest object version of the object in the bucket; and preventing an additional object version of the object from being added to the bucket during a retention period associated with the latest object version of the object.

8. The method of any of the preceding statements, wherein the applying the retention policy to the object includes: detecting an operation that causes an additional object version to be stored within the bucket; determining that a retention period associated with a latest object version of the object has ended; storing, in response to the determining that the retention period associated with the latest object version of the object has ended, the additional object version of the object within the bucket: and preventing the additional object version of the object from being deleted or overwritten during a retention period associated with the additional object version, the retention period starting at a creation timestamp of the additional object version and extending for the predefined time duration.

9. The method of any of the preceding statements, wherein: the retention policy prevents the bucket from being eradicated during a recoverable time period after the bucket is deleted; and the bucket is ineradicable by a user associated with a client of the object-based storage system.

10. The method of any of the preceding statements, further comprising: determining, by the object retention management system from one or more object versions of one or more objects in the bucket, an object version of a first object and an object version of a second object in which a first retention period associated with the object version of the first object and a second retention period associated with the object version of the second object have ended; and automatically deleting, by the object retention management system, the object version of the first object and the object version of the second object from the bucket.

11. The method of any of the preceding statements, further comprising: automatically assigning, by the object retention management system, one or more metadata tags to one or more objects in the bucket; detecting, by the object retention management system, an operation request associated with a metadata tag; identifying, by the object retention management system, an object version of a particular object among the one or more objects based on the metadata tag and a retention period associated with the object version; and performing the operation request using the object version of the particular object.

12. The method of any of the preceding statements, wherein the applying the retention policy to the object further includes: determining that data of the object-based storage system is possibly being targeted by a security threat; and preventing, based on the determining that the data of the object-based storage system is possibly being targeted by the security threat, one or more object versions of the object from being deleted or overwritten during an additional retention period.

13. The method of any of the preceding statements, wherein the applying the retention policy to the object further includes: determining that the object is additionally subjected to an indefinite hold policy, the indefinite hold policy preventing the object from being deleted or overwritten until the indefinite hold policy is disabled for the object; determining that the indefinite hold policy is disabled for the object during a retention period associated with an object version of the object in the bucket; and preventing, in response to the determining that the indefinite hold policy is disabled for the object during the retention period associated with the object version of the object, the object version of the object from being deleted or overwritten until the retention period associated with the object version has ended.

14. The method of any of the preceding statements, wherein the applying the retention policy to the object further includes: determining that the object is additionally subjected to a lifecycle policy, the lifecycle policy automatically deleting the object or moving the object to a different bucket of the object-based storage system when a life event of the object is triggered; determining that the life event of the object is triggered during a retention period associated with an object version of the object in the bucket; and preventing, in response to the determining that the life event of the object is triggered during the retention period associated with the object version of the object, the object version of the object from being deleted or moved to the different bucket until the retention period associated with the object version has ended.

15. The method of any of the preceding statements, further comprising: preventing, by the object retention management system, an object version of the object from being added to the bucket.

16. The method of any of the preceding statements, further comprising: establishing, by the object retention management system, an additional retention policy for a different bucket of the object-based storage system; detecting, by the object retention management system, an additional operation that causes an additional object to be stored within the different bucket; and applying, by the object retention management system based on the detecting of the additional operation, the additional retention policy to the additional object.

17. A system comprising: a memory storing instructions; a processor communicatively coupled to the memory and configured to execute the instructions to: establish a retention policy for a bucket of an object-based storage system; detect an operation that causes an object to be stored within the bucket; and apply, based on the detecting of the operation, the retention policy to the object, the retention policy preventing the object from being deleted or overwritten for a predefined time duration.

18. The system of any of the preceding statements, wherein the object comprises a first object version and a second object version, and wherein the applying the retention policy to the object includes: preventing the first object version from being deleted or overwritten during a first retention period associated with the first object version, the first retention period starting at a creation timestamp of the first object version and extending for the predefined time duration; and preventing the second object version from being deleted or overwritten during a second retention period associated with the second object version, the second retention period starting at a creation timestamp of the second object version and extending for the predefined time duration.

19. The system of any of the preceding statements, wherein the applying the retention policy to the object includes: determining a latest object version of the object in the bucket; and preventing an additional object version of the object from being added to the bucket during a retention period associated with the latest object version of the object.

20. A non-transitory computer-readable medium storing instructions that, when executed, direct a processor of a computing device to: establish a retention policy for a bucket of an object-based storage system; detect an operation that causes an object to be stored within the bucket; and apply, based on the detecting of the operation, the retention policy to the object, the retention policy preventing the object from being deleted or overwritten for a predefined time duration.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

In some embodiments, any of the storage systems described herein may implement an object-based storage system in which data is stored and managed in the form of objects. In some embodiments, the object-based storage system may include one or more buckets, and each bucket may store one or more objects. Thus, the object-based storage system may have a flat structure instead of a hierarchical structure because there are no sub-buckets, subfolders, and/or other storage structures within the buckets. In some embodiments, a bucket in the object-based storage system may be identified by a bucket identifier (e.g., a bucket name) that is globally unique in the object-based storage system.

In some embodiments, an object in the object-based storage system may include the data itself (e.g., text, image, audio, etc.), object metadata of the object, and an object identifier of the object. In some embodiments, the object may be identified by its object identifier (also referred to as object key). Such object key may be locally unique in the bucket within which the object is stored or globally unique in the object-based storage system. In some embodiments, the object metadata of the object may provide various information about the object. For example, the object metadata of the object may indicate one or more of a creation timestamp of the object, a last modified timestamp of the object, an object type of the object, a tag associated with the object, an access control list associated with the object, etc.

Figure 4:
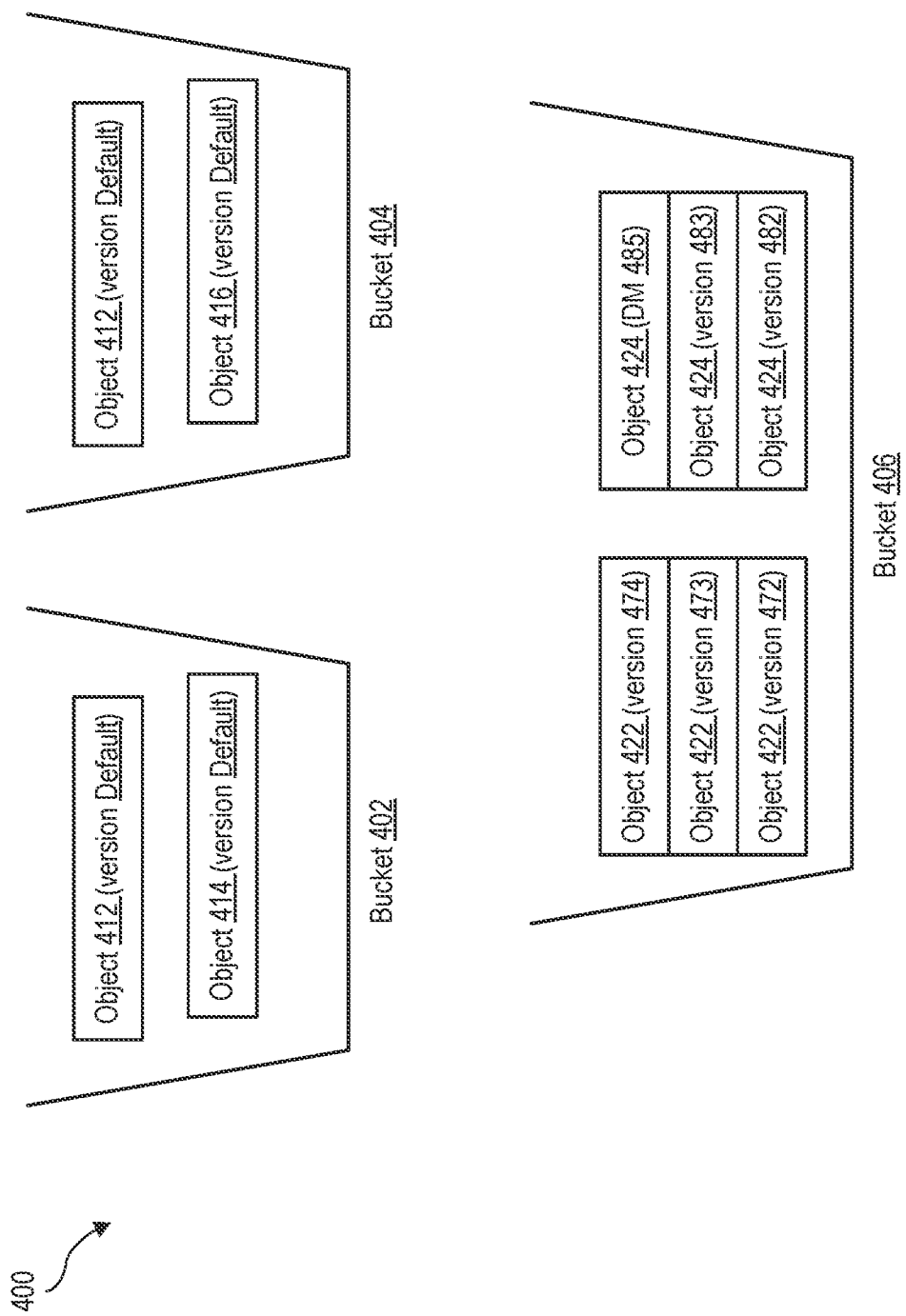
FIG. 4 illustrates exemplary buckets in an object-based storage system in accordance with some embodiments of the present disclosure.

As described herein, a bucket may store one or more objects. In some embodiments, the bucket may be configured to enable or disable object versioning. For example, FIG. 4 illustrates diagram 400 in which object versioning is enabled for a bucket 406 and disabled for buckets 402 and 404. As object versioning is enabled for bucket 406, bucket 406 may store multiple object versions of the same object. Each object version of the object may be associated with the object key of the object and may be assigned a unique version identifier (ID). Thus, different object versions of the same object may have the same object key and different version IDs. For example, as depicted in FIG. 4, bucket 406 may store an object version 472 of an object 422, an object version 473 of object 422, and an object version 474 of object 422. FIG. 4 also shows that bucket 406 may store an object version 482 of an object 424 and an object version 483 of object 424.

In some embodiments, when an additional object version of an object is placed into a versioning-enabled bucket such as bucket 406, other existing object versions of the object in the bucket may remain in the bucket without being overwritten. The additional object version of the object may become a latest object version of the object that is placed into the bucket most recently among multiple object versions of the object. Accordingly, the additional object version may be considered a current object version of the object. Other object versions that are placed into the bucket prior to the current object version of the object may be considered non-current object versions of the object. Because multiple object versions of the object are stored in the bucket, each object version of the object can be retrieved as needed using its version ID, thereby enabling object recovery.

In some embodiments, the object-based storage system may receive an operation request requesting an operation (e.g., read operation, etc.) to be performed on a data item stored in the object-based storage system. In some embodiments, for an object stored in a versioning-enabled bucket, if the operation request specifies the object key of the object and does not specify a version ID, the object-based storage system may perform the requested operation on the latest object version of the object. On the other hand, if the operation request specifies a version ID, the object-based storage system may perform the requested operation on the object version of the object corresponding to the version ID among multiple object versions of the object in the bucket.

In some embodiments, the object-based storage system may receive a delete request requesting a data item to be deleted from the object-based storage system. In some embodiments, for an object stored in a versioning-enabled bucket, if the delete request specifies the object key of the object and does not specify a version ID, the object-based storage system may insert a delete marker in the bucket. For example, the object-based storage system may insert a delete marker 485 for object 424 in bucket 406 as depicted in FIG. 4. The delete marker may become the latest object version of the object and may be associated with the object key of the object and a unique version ID.

In some embodiments, when an operation request specifies the object key of the object without a version ID and the latest object version of the object is the delete marker, the object-based storage system may respond that the object is not found. Thus, the object-based storage system may respond as if the object no longer exists in the bucket, although no object version of the object has been erased from the bucket and these object versions can still be retrieved using their version ID. On the other hand, if the delete request specifies a version ID, the object-based storage system may delete the object version of the object corresponding to the version ID among multiple object versions of the object in the bucket. Such an object version may be permanently deleted from the bucket and can no longer be retrieved from the object-based storage system.

As depicted in FIG. 4, object versioning is disabled for buckets 402 and 404, and thus these buckets may store only one object version for each object. This object version may be associated with the object key of the object and may be assigned a default version ID. For example, as depicted in FIG. 4, bucket 402 may store one object version of object 412 and one object version of object 414. Bucket 404 may store one object version of object 412 and one object version of object 416. The only object version of these objects may all have a default version ID (e.g., null).

In some embodiments, when a new object version of an object is placed into a versioning-disabled bucket such as bucket 402 or bucket 404, the existing object version of the object in the bucket may be overwritten and therefore may be replaced with the new object version. As a result, the versioning-disabled bucket may only store the latest object version of the object that is placed into the bucket most recently. For an object stored in a versioning-disabled bucket, an operation request may specify the object key of the object, and the object-based storage system may perform the requested operation on the only object version of the object in the bucket. For example, the operation request may be a delete request specifying the object key of the object. In response to the delete request, the object-based storage system may delete the only object version of the object in the bucket. Such object version may be permanently deleted from the bucket and thus there is no object version of the object stored in the bucket to be used for object recovery.

In some embodiments, a user associated with a client of the object-based storage system may be granted an extensive access control over objects of the client that are stored in the object-based storage system. For example, the user may be allowed to initiate various operations (e.g., read operations, write operations, delete operations, execute operations, etc.) on objects stored in one or more buckets. Due to such extensive access control, the user (e.g., manager, administrator, etc.) may accidentally or intentionally delete objects from versioning-disabled buckets and/or delete object versions of objects from versioning-enabled buckets. For example, a disgruntled manager, operator, developer, or administrator may intentionally attempt to delete and/or overwrite data in various buckets, thereby causing data loss to the client as a revenge action.

To prevent the data loss, a conventional object-based storage system may protect versions of data in the object-based storage system from being deleted or modified without first making a new version or replacing an existing version with a new version prior to some elapsed time period. However, this kind of protection may only be applicable to data stored in a versioning-enabled bucket and may only apply to an individual object version of an object. For example, a first object version of an object may be protected from deletion and overwriting while a second object version of the same object may not.

Furthermore, for an object in a versioning-enabled bucket, the conventional object-based storage system may allow a new object version of the object to be created during a time period in which a current object version of the object is protected from deletion, modification, or replacement. Thus, the new object version may become the current object version and may be retrieved by a software application (e.g., web application) that uses the object. As a result, operations of the software application may be impacted by the new object version (e.g., an appearance of a website associated with the web application may change) even though the current object version of the object is still under protection. Therefore, the data protection provided by the conventional object-based storage system is generally ineffective and impractical in protecting the software application from undesired impacts to its operations.

As described herein, an object retention management system associated with an object-based storage system may establish a retention policy for a bucket of the object-based storage system. When the object retention management system detects an operation that causes an object to be stored within the bucket, the object retention management system may apply the retention policy to the object. The retention policy may prevent the object from being deleted or overwritten for a predefined time duration.

Figure 5:
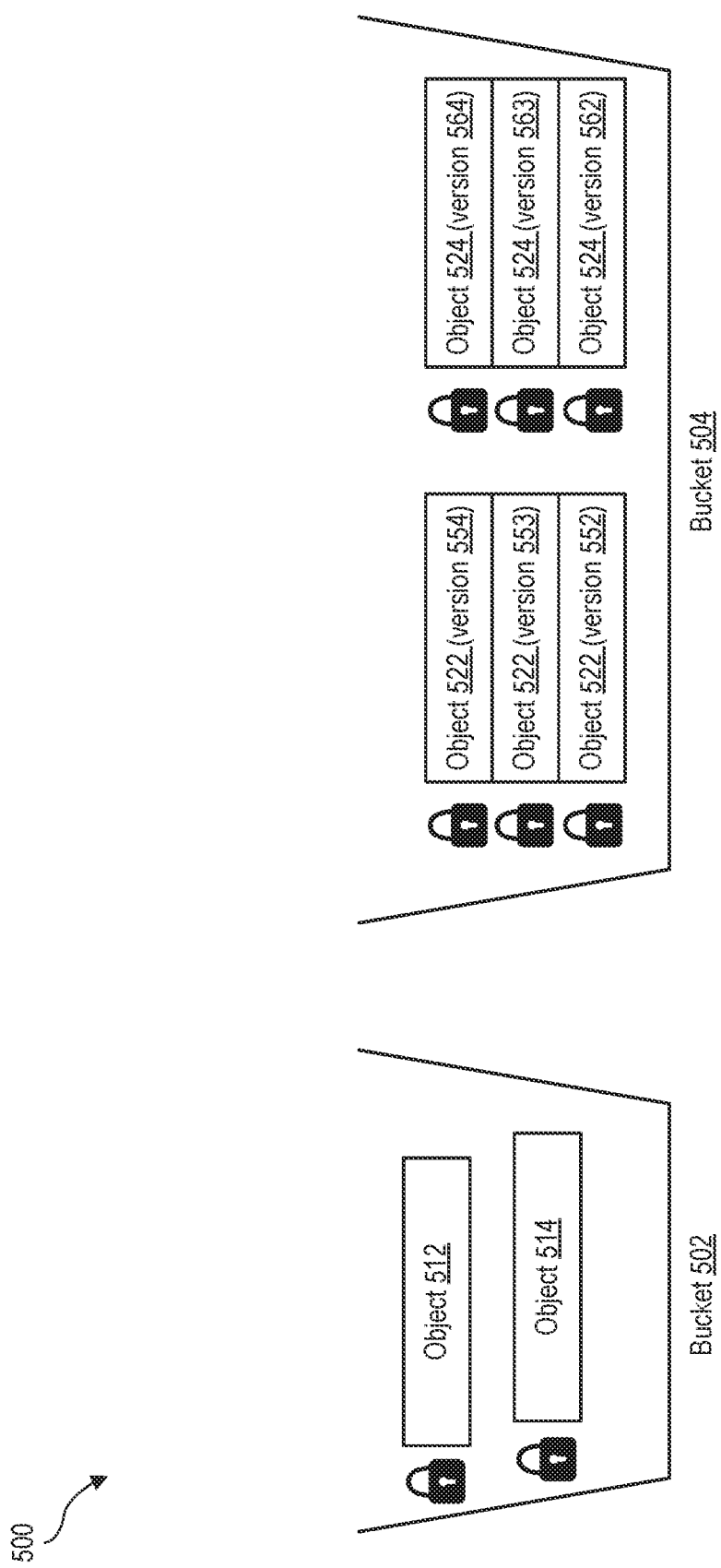
FIG. 5 illustrates exemplary buckets having a retention policy implemented in accordance with some embodiments of the present disclosure.

The systems and methods described herein are advantageous in a number of technical respects. For example, the object retention management system may apply the retention policy to objects in a versioning-disabled bucket and/or objects in a versioning-enabled bucket. As an example, FIG. 5 illustrates diagram 500 in which the retention policy is applied to a versioning-disabled bucket 502 and a versioning-enabled bucket 504, as indicated by the lock symbols depicted in FIG. 5. As depicted in FIG. 5, for versioning-disabled bucket 502 that stores only one object version of each object (e.g., an object 512 and an object 514), the object retention management system may prevent the only object version of each object from being deleted or overwritten for the predefined time duration since that object version is placed into the bucket. For versioning-enabled bucket 504 that stores multiple object versions of each object (e.g., object versions 552, 553, 554 of an object 522, and object versions 562, 563, 564 of an object 524), the object retention management system may prevent each object version of each object from being deleted or overwritten for the predefined time duration since that object version is placed into the bucket. Accordingly, the object retention management system may prevent data in a bucket from being deleted or overwritten at an object level based on the retention policy. Additionally, the retention policy may be applicable to objects in any bucket regardless of whether the bucket is configured with or without object versioning.

Furthermore, once a retention policy is enabled for a bucket as requested by a client of the object-based storage system, the retention policy can only be disabled or modified based on one or more predefined rules that are independent from user actions of a user associated with the client. For example, the predefined rules may specify a set of required authorizations by one or more authorized entities (e.g., users, storage system vendors, third-party operators, etc.) to disable the retention policy for the bucket and/or to modify the predefined time duration. Thus, when a user cannot delete or overwrite data in the bucket for the predefined time duration due to the retention policy, the user also cannot disable or modify the retention policy to allow these operations unless the predefined rules are satisfied. As a result, the data may be retained in the bucket at least for the predefined time duration, and therefore data loss caused by accidental or intentional user actions of the user can be prevented at least for the predefined time duration, even if the user is granted an access control to delete and/or overwrite the data in the bucket.

Moreover, for a versioning-disabled bucket, when an only object version of an object in the bucket is subjected to the retention policy and cannot be deleted or overwritten, the object retention management system may prevent another object version of the object from being placed into the bucket to replace the only object version of the object existing in the bucket. Similarly, for a versioning-enabled bucket, when a current object version of an object in the bucket is subjected to the retention policy and cannot be deleted or overwritten, the object retention management system may prevent an additional object version of the object from being added into the bucket and becoming the current object version of the object in the bucket. Accordingly, for both a versioning-disabled bucket and a versioning-enabled bucket, a current object version of an object in the bucket cannot be replaced by a new object version of the object when the current object version is under a protection provided by the retention policy. As a result, when the current object version of the object is protected from deletion and overwriting for a retention period specified by the retention policy, a software application using the object may consistently retrieve that current object version of the object from the bucket, and therefore changes to operations of the software application caused by a new object version of the object can be avoided during the retention period associated with the current object version.

In addition, the object retention management system may automatically assign one or more metadata tags to an object in a bucket. For example, the object retention management system may assign metadata tags to an only object version of an object in a versioning-disabled bucket and/or assign metadata tags to multiple object versions of an object in a versioning-enabled bucket. The metadata tags associated with an object version of an object may indicate a creation timestamp of the object version, a retention complete timestamp of the object version, a last modified timestamp of the object version, a project associated with the object, and/or other attributes. As a result, the object versions of the objects may be selectively retrieved based on the metadata tags, thereby facilitating object and object version management.

Furthermore, in addition to preventing objects in the bucket from being deleted or overwritten for the predefined time duration, the retention policy may also prevent the bucket from being eradicated during a recoverable time period after the bucket is deleted. Accordingly, when the bucket is deleted, the bucket and its content may not be deleted permanently and can still be recovered during the recoverable time period.

Figure 6:
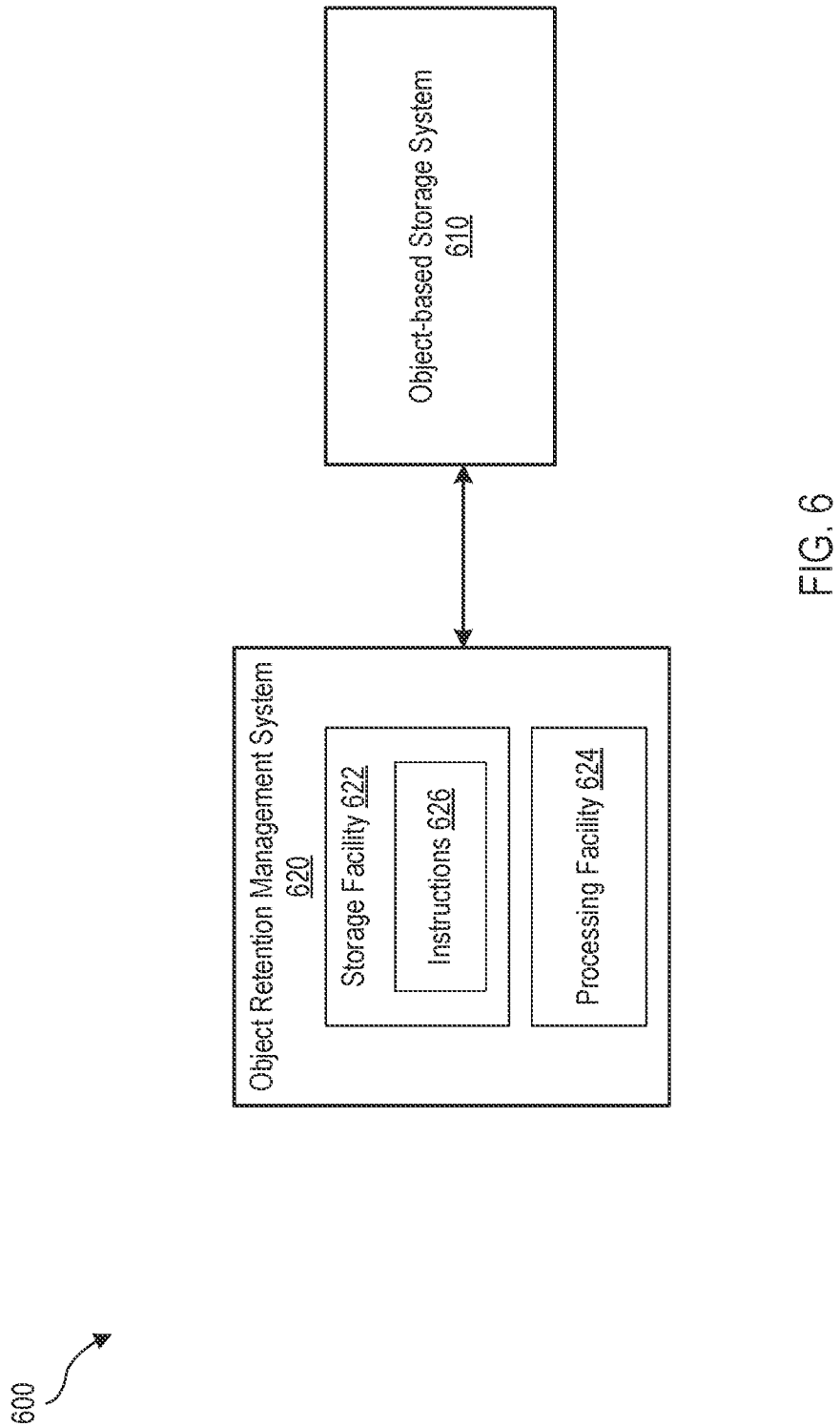
FIG. 6 illustrates exemplary object retention management system in accordance with some embodiments of the present disclosure.

FIG. 6 illustrates an exemplary system 600 in accordance with some embodiments of the present disclosure. As depicted in FIG. 6, system 600 may include an object-based storage system 610 and an object retention management system 620.

In some embodiments, object-based storage system 610 may be a storage system that stores client data of one or more clients (e.g., business entities, government agencies, etc.). Object-based storage system 610 may be implemented by any of the storage systems, devices, and/or components described herein. In some embodiments, object-based storage system 610 may be an on-premises storage system (e.g., a local storage system located on-site at a facility of an organization), a cloud-based storage system (e.g., a storage system located on a cloud server of a cloud services provider), a storage system of an electronic device (e.g., a storage system of a personal computer, a laptop, a mobile phone, etc.), or any combination thereof. In some embodiments, object-based storage system 610 may store and manage data in the form of objects. For example, object-based storage system 610 may include one or more buckets, and each bucket may store one or more objects as described herein.

In some embodiments, object retention management system 620 may be communicatively coupled to object-based storage system 610 and configured to manage a retention of objects stored in object-based storage system 610. As depicted in FIG. 6, object retention management system 620 may include, without limitation, a storage facility 622 and a processing facility 624 selectively and communicatively coupled to one another. Facilities 622 and 624 may each include or be implemented by hardware and/or software components (e.g., processors, memories, communication interfaces, instructions stored in memory for execution by the processors, etc.). In some embodiments, facilities 622 and 624 may be distributed between multiple devices and/or multiple locations as may serve a particular implementation. In some examples, facilities 622 and/or 624 may be implemented by one or more components included in object-based storage system 610 and/or applications executed by object-based storage system 610. Additionally or alternatively, facilities 622 and/or 624 may be implemented by one or more components configured to communicate with object-based storage system 610 by way of a network and/or other suitable connection.

Storage facility 622 may maintain (e.g., store) executable data used by processing facility 624 to perform any of the operations described herein. For example, storage facility 622 may store instructions 626 that may be executed by processing facility 624 to perform any of the operations described herein. Instructions 626 may be implemented by any suitable application, software, code, and/or other executable data instance. Storage facility 622 may also maintain any data received, generated, managed, used, and/or transmitted by processing facility 624. Storage facility 622 may additionally maintain any other suitable type of data as may serve a particular implementation.

Processing facility 624 may be configured to perform (e.g., execute instructions 626 stored in storage facility 622 to perform) various processing operations described herein. References herein to operations performed by object retention management system 620 may be understood to be performed by processing facility 624.

Figure 7:
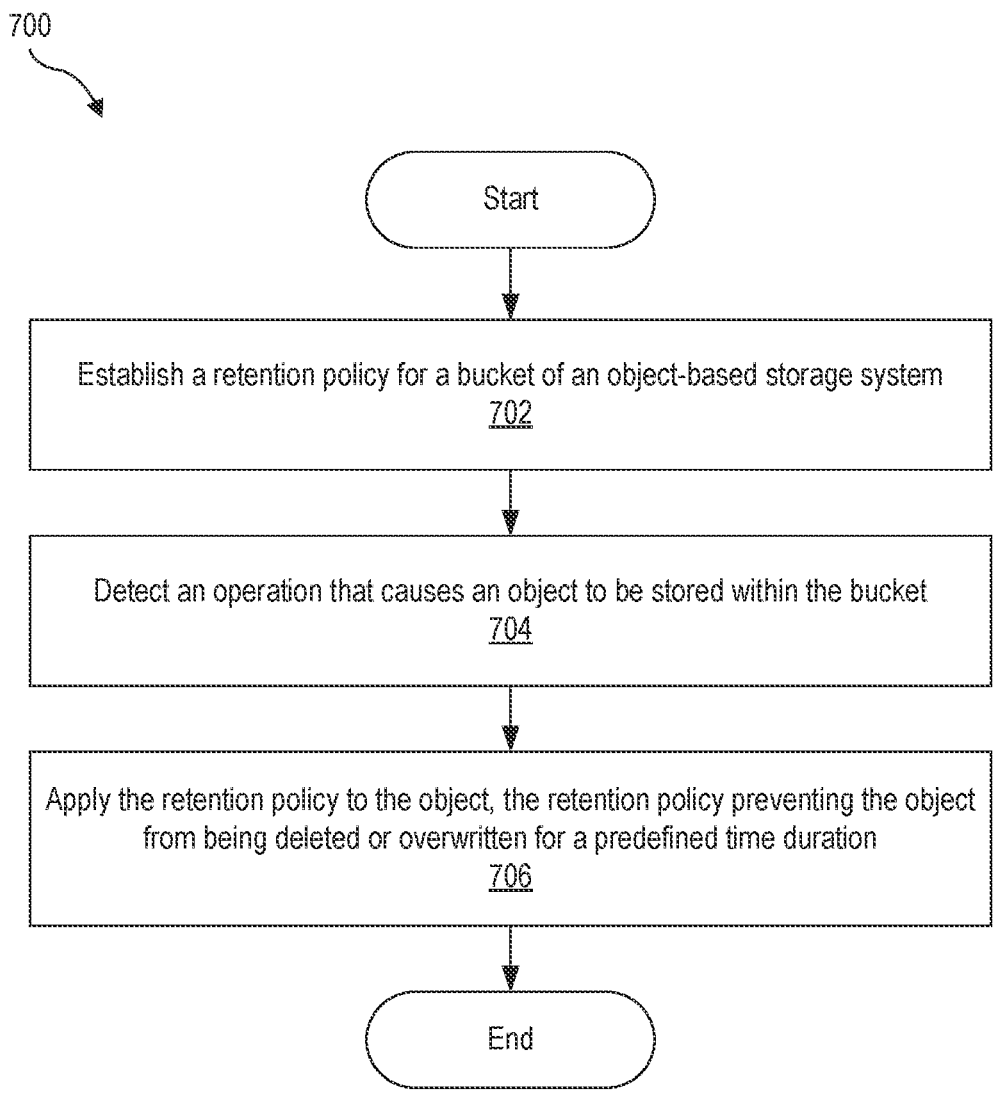
FIG. 7 illustrates an exemplary method in accordance with some embodiments of the present disclosure.

FIG. 7 illustrates an exemplary method 700 that may be performed by object retention management system 620 ("system 620") associated with object-based storage system 610 and/or any implementation thereof. Method 700 may be used alone or in combination with other methods described herein.

At operation 702, system 620 may establish a retention policy for a bucket of object-based storage system 610. The retention policy may specify a predefined time duration (e.g., 8 days or any other suitable time duration) for which an object must be retained in the bucket from when the object is placed into the bucket.

At operation 704, system 620 may detect an operation that causes an object to be stored within the bucket. For example, the operation may be a write operation, a copy operation, and/or other operations provided by a client of object-based storage system 610 that results in the object being placed into the bucket.

At operation 706, system 620 may apply, based on the detecting of the operation, the retention policy to the object. The retention policy may prevent the object from being deleted or overwritten for the predefined time duration. Accordingly, the object cannot be deleted or overwritten during a retention period that starts at a creation timestamp of the object and extends for the predefined time duration. As a result, the object must be maintained in the bucket at least for the predefined time duration.

As an example, the bucket may be a versioning-disabled bucket that stores only one object version of the object as described herein. To store an object in the bucket, an object version of the object that has an object key (e.g., object name) of the object and a default version ID (e.g., null) is placed into the bucket. In some embodiments, as the retention policy associated with the bucket is applied to the object, system 620 may prevent the object version of the object from being deleted from the bucket during a retention period associated with the object version. System 620 may also prevent the object version of the object from being overwritten and replaced by another object version of the object during the retention period. The retention period may start from a creation timestamp of the object version at which the object version of the object is placed into the bucket and may extend for the predefined time duration specified by the retention policy. Thus, the only object version of the object in the bucket may be retained in the bucket for at least the predefined time duration since such object version is placed into the bucket.

Accordingly, if system 620 receives a request to delete the object version of the object or to overwrite the object version of the object with a different object version of the object during the retention period of the object version, such request may be rejected and, in some examples, responded to with an access denied error. For example, system 620 may detect a delete request provided by a user associated with the client. The delete request may specify the object key of the object. In some embodiments, if this delete request is allowed to be performed, system 620 may delete the only object version of the object in the bucket, thereby deleting the object from the bucket. Additionally or alternatively, system 620 may detect a write request provided by the user or another user associated with the client. The write request may specify a different object version of the object that has the same object key as the object version of the object existing in the bucket. In some embodiments, if this write request is allowed to be performed, system 620 may overwrite the object version of the object existing in the bucket with the different object version of the object, thereby replacing the object version of the object existing in the bucket with the different object version of the object.

In some embodiments, in response to receiving the delete request and/or the write request above, system 620 may determine that the object version of the object existing in the bucket is still in its retention period during which the object version of the object cannot be deleted or overwritten. Accordingly, system 620 may reject these requests and, in some examples, respond to these requests with an access denied error.

As another example, the bucket may be a versioning-enabled bucket that stores one or more object versions of the object as described herein. For example, the object may have a first object version and a second object version stored in the bucket. The first object version may have the object key of the object and a first version ID. The second object version may have the same object key of the object and a second version ID.

In some embodiments, as the retention policy associated with the bucket is applied to the object, system 620 may prevent the first object version of the object from being deleted or overwritten during a first retention period associated with the first object version. The first retention period may start from a creation timestamp of the first object version at which the first object version of the object is placed into the bucket and may extend for the predefined time duration specified by the retention policy. Similarly, system 620 may prevent the second object version of the object from being deleted or overwritten during a second retention period associated with the second object version. The second retention period may start from a creation timestamp of the second object version at which the second object version of the object is placed into the bucket and may extend for the predefined time duration specified by the retention policy. Thus, each object version of the object in the bucket may be retained in the bucket at least for the predefined time duration since that object version is placed into the bucket.

Accordingly, if system 620 receives a request to delete or overwrite an object version of the object during the retention period of the object version, such request may be rejected and, in some examples, responded to with an access denied error. For example, system 620 may detect a delete request provided by a user associated with the client. The delete request may specify a version ID of the object version of the object. In some embodiments, if this delete request is allowed to be performed, system 620 may delete the object version of the object having that version ID from the bucket. Additionally or alternatively, system 620 may detect a write request or a modify request provided by the user or another user associated with the client. The write request may specify a different object version of the object that has the same object key as the object version of the object. The modify request may specify a modification to the object version of the object. In some embodiments, if these write request and/or modify request are allowed to be performed, system 620 may create a different object version of the object based on the request and add the different object version of the object to the bucket. The different object version of the object may then become a new current object version of the object.

In some embodiments, in response to receiving the delete request, the write request, and/or the modify request above, system 620 may determine that the object version of the object existing in the bucket is still in its retention period during which the object version of the object cannot be deleted or overwritten. Accordingly, system 620 may reject these requests and, in some examples, respond to these requests with an access denied error.

In some embodiments, system 620 may consider modifying object metadata (e.g., object type, object tag, access control list, etc.) associated with an object version of an object as overwriting the object version of the object. Accordingly, if system 620 receives a request to modify the object metadata associated with the object version of the object and/or a request to assign or remove an object tag for the object version of the object during the retention period associated with the object version of the object, system 620 may also reject these requests and, in some examples, respond to these requests with an access denied error.

Thus, when a retention policy is enabled for a bucket, each object version of an object in the bucket (e.g., an only object version of the object if the bucket is a versioning-disabled bucket, or each object version in one or more object versions of the object if the bucket is a versioning-enabled bucket) may be subjected to its own retention period and therefore may not be deleted or overwritten for at least the predefined time duration specified by the retention policy.

In some embodiments, the retention policy may specify the predefined time duration based on one or more object attributes of the object. Non-limiting examples of an object attribute that may be associated with an object include a creation timestamp at which an object version of the object is placed into the bucket, an object type (e.g., image, audio, text, etc.) of the object, a tag associated with the object, and/or other object attributes. As an example, the retention policy may specify a predefined time duration (e.g., 10 days) for object versions of objects that are created during a weekend or a holiday, and specify another predefined time duration (e.g., 8 days) for other objects and/or other object versions that are created during a work day. As another example, the retention policy may specify a particular predefined time duration for objects associated with a particular tag. In some embodiments, system 620 may require that the predefined time duration specified by the retention policy satisfies a time duration threshold. For example, system 620 may require that the predefined time duration is equal to or longer than 1 day. If the predefined time duration specified by the retention policy does not satisfy the time duration threshold, system 620 may reject the configuration of the retention policy and/or automatically extend the predefined time duration to satisfy the time duration threshold. Other implementations of the predefined time durations in the retention policy are also possible and contemplated.

In some embodiments, system 620 may apply different retention policies for different buckets of object-based storage system 610. For example, in addition to a retention policy applied to objects in a bucket of object-based storage system 610, system 620 may establish an additional retention policy for a different bucket of object-based storage system 610. System 620 may detect an additional operation that causes an additional object to be stored within the different bucket. System 620 may then apply, based on the detecting of the additional operation, the additional retention policy to the additional object. Accordingly, the additional object cannot be deleted or overwritten for a predefined time duration specified by the additional retention policy.

As an example, system 620 may establish a first retention policy for a first bucket in object-based storage system 610. System 620 may apply the first retention policy to a first object stored in the first bucket, thereby preventing each object version of the first object from being deleted or overwritten for a first predefined time duration specified by the first retention policy. In addition to the first retention policy applied to the first bucket, system 620 may also establish a second retention policy for a second bucket in object-based storage system 610. System 620 may apply the second retention policy to a second object stored in the second bucket, thereby preventing each object version of the second object from being deleted or overwritten for a second predefined time duration specified by the second retention policy. In some embodiments, the first predefined time duration specified by the first retention policy may be different from the second predefined time duration specified by the second retention policy. Accordingly, an object version of the first object in the first bucket may be retained for a different predefined time duration than an object version of the second object in the second bucket.

In some embodiments, instead of applying different retention policies for different buckets, system 620 may establish and apply the same retention policy for different buckets of object-based storage system 610. For example, system 620 may apply the same retention policy to a plurality of buckets in the object-based storage system 610 or to all buckets in the object-based storage system 610. As a result, each object version of each object in these buckets may be retained for the same predefined time duration.

In some embodiments, once a retention policy is enabled for a bucket, the retention policy cannot be disabled for the bucket by a user associated with the client and can only be disabled for the bucket based on a predefined rule that is independent from a user action of the user. In some embodiments, the predefined rule may specify a set of required authorizations by one or more authorized entities (e.g., users, storage system vendors, third-party operators, cloud service agents, AI engines, etc.) to disable the retention policy for the bucket. For example, the predefined rule may stipulate that only a third-party operator or a cloud service agent is allowed to disable the retention policy. Additionally or alternatively, the predefined rule may stipulate various combinations of authorizations by a plurality authorized entities that are needed to disable the retention policy. For example, the combinations may require at least an authorization by a particular type of user (e.g., authorized user at CxO level), authorizations by multiple authorized users, authorizations by various subsets of a predefined group including users, AI engines, third-party operators, etc. Accordingly, when the user initiates an operation to delete or overwrite an object in the bucket and the operation is rejected due to the retention policy, the user may not be able to disable the retention policy for the bucket to allow the operation unless the required authorizations are provided to satisfy the predefined rule.

In some embodiments, the retention policy applied to the bucket also cannot be modified by the user associated with the client. For example, once the predefined time duration is configured in the retention policy based on a request from the client, the predefined time duration is unmodifiable by the user and can only be modified based on an additional predefined rule that is independent from a user action of the user. In some embodiments, similar to the predefined rule to disable the retention policy for the bucket described above, the additional predefined rule may specify a set of required authorizations by one or more authorized entities to modify the retention policy. Accordingly, when the user initiates an operation to delete or overwrite an object in the bucket and the operation is rejected due to the retention policy, the user may not be able to modify the predefined time duration specified by the retention policy to allow the operation unless the required authorizations are provided to satisfy the additional predefined rule. It should be understood that the authorizations required by the additional predefined rule to modify the retention policy may be the same as or may be different from the authorizations required by the predefined rule to disable the retention policy for the bucket.

In some embodiments, the retention policy may apply not only at the object level to protect objects in the bucket from deletion and overwriting as described herein, but also apply at a bucket level to protect the bucket from eradication. In some embodiments, the bucket may be deleted at a deletion timestamp using a deletion command. In some embodiments, the bucket can be deleted using the deletion command but cannot be deleted using an API request of object-based storage system 610 even if the bucket is empty. In some embodiments, once the bucket is deleted, object-based storage system 610 may automatically eradicate the bucket after a default eradication window.

In some embodiments, the retention policy may prevent the bucket from being eradicated during a recoverable time period after the bucket is deleted. The recoverable time period may have a different time duration from (e.g., a longer time duration than) the default eradication window applied to the bucket by object-based storage system 610. Alternatively, the recoverable time period may have the same time duration as the default eradication window. In some embodiments, if the recoverable time period has a shorter time duration than the default eradication window, system 620 may prevent the bucket from being eradicated during the default eradication window instead of the recoverable time period, thereby preventing the data in the bucket from being permanently deleted for a longer time duration.

In some embodiments, if the bucket is deleted before the retention policy is enabled for the bucket, system 620 may maintain the default eradication window for the bucket and disregard the recoverable time period specified by the retention policy. Alternatively, system 620 may adjust the default eradication window of the bucket to match the recoverable time period specified by the retention policy. Similarly, if the bucket is deleted before the retention policy is disabled for the bucket, system 620 may maintain the recoverable time period for the bucket as specified by the retention policy and disregard the default eradication window. Alternatively, system 620 may adjust the recoverable time period of the bucket to match the default eradication window.

As described herein, the retention policy may prevent the bucket from being eradicated during the recoverable time period after the bucket is deleted. In some embodiments, the recoverable time period may start from the deletion timestamp of the bucket and may extend for a time duration that is the same as or different from the predefined time duration for which objects are retained in the bucket. In some embodiments, system 620 may dynamically adjust the recoverable time period of the bucket. For example, system 620 may flexibly extend the recoverable time period of the bucket so that the recoverable time period of the bucket may not end before each retention period associated with each object version of various objects in the bucket ends. In some embodiments, when the bucket is deleted, the bucket and objects in the bucket may not be deleted permanently and a storage space occupied by the bucket and these objects may not be reclaimed or overwritten with other data at least during the recoverable time period. As a result, the bucket and its content can be recovered during the recoverable time period after the bucket is deleted.

In some embodiments, the bucket may be ineradicable by a user associated with the client. Instead, the bucket may be eradicated automatically by object-based storage system 610 when the recoverable time period ends and/or may be eradicated based on a predefined rule. In some embodiments, similar to the predefined rules to disable or modify the retention policy described herein, the predefined rule may specify a set of required authorizations by one or more authorized entities to eradicate the bucket or to modify the recoverable time period of the bucket. For example, the predefined rule may stipulate that only a third-party operator or a cloud service agent is allowed to eradicate the bucket or modify the time duration of the recoverable time period applied to the bucket. Additionally or alternatively, the predefined rule may stipulate various combinations of authorizations by a plurality authorized entities (e.g., users, third-party operators, cloud service agents, AI engines, etc.) that are needed to eradicate the bucket or modify the time duration of the recoverable time period applied to the bucket. Accordingly, the user cannot eradicate the bucket or modify the recoverable time period of the bucket unless the required authorizations are provided to satisfy the predefined rule.

In some embodiments, in addition to protecting objects in the bucket from deletion and overwriting and/or protecting the bucket from eradication as described herein, the retention policy may also prevent a new object version of the object from being placed into the bucket when a latest object version (e.g., a current object version) of the object in the bucket is still in its retention period. This implementation is advantageous, because it allows a software application using the object to consistently retrieve the latest object version of the object during the retention period of the latest object version. As a result, operations of the software application may not be impacted by a new object version of the object being placed into the bucket when the latest object version of the object in the bucket is still protected from deletion and overwriting.

In some embodiments, system 620 may determine the latest object version of the object in the bucket. As described herein, if the bucket is a versioning-disabled bucket, the latest object version of the object may be the only object version of the object existing in the bucket. If the bucket is a versioning-enabled bucket, the latest object version of the object may be the object version of the object that is placed into the bucket most recently among multiple object versions of the object existing in the bucket.

In some embodiments, system 620 may prevent an additional object version of the object from being added to the bucket during the retention period associated with the latest object version of the object. For example, if the bucket is a versioning-disabled bucket and the only object version of the object in the bucket is still in its retention period, system 620 may reject a write request to write an additional object version of the object to the bucket. Accordingly, the latest and only object version of the object in the versioning-disabled bucket may not be overwritten and replaced by an additional object version of the object during the retention period of the latest object version.

As another example, if the bucket is a versioning-enabled bucket and the latest object version (e.g., the current object version) of the object in the bucket is still in its retention period, system 620 may reject a write request to write an additional object version of the object to the bucket. System 620 may also reject a modify request to modify an existing object version of the object in the bucket that would result in an additional object version of the object being added to the bucket. Accordingly, the latest object version among multiple object versions of the object in the versioning-enabled bucket may not be replaced by an additional object version of the object during the retention period of the latest object version.

In some embodiments, the retention policy may allow an additional object version of the object to be placed into the bucket if the retention period associated with the latest object version of the object in the bucket has elapsed.

To illustrate, system 620 may detect an operation that causes an additional object version of the object to be stored within the bucket. The operation may be a write operation, a modify operation, and/or other operations that results in the additional object version of the object being placed into the bucket as described herein.

In response to the detecting of the operation, system 620 may determine that the retention period associated with the latest object version of the object has ended. In response to the determining that the retention period associated with the latest object version of the object has ended, system 620 may store the additional object version of the object within the bucket. For example, if the bucket is a versioning-disabled bucket, system 620 may overwrite the latest and only object version of the object in the bucket with the additional object version of the object, thereby replacing the object version of the object existing in the bucket with the additional object version. As another example, if the bucket is a versioning-enabled bucket, system 620 may add the additional object version of the object to the bucket, and thus the additional object version may become the latest object version (e.g., the current object version) of the object in the bucket.

In some embodiments, once the additional object version of the object is placed into the bucket, the additional object version of the object may in turn be subjected to its own retention period. Accordingly, system 620 may prevent the additional object version of the object from being deleted or overwritten during the retention period associated with the additional object version of the object. Similar to other object versions of the object, the retention period associated with the additional object version of the object may start at a creation timestamp of the additional object version at which the additional object version is placed into the bucket and may extend for a predefined time duration specified by the retention policy.

In some embodiments, for each object version of an object in a bucket, once a retention period associated with the object version of the object is over, the object version of the object can be deleted or overwritten. For example, system 620 may determine that the retention period associated with the object version of the object has ended. In response to the determining that the retention period associated with the object version of the object has ended, system 620 may allow the object version of the object to be deleted or overwritten.

As an example, if the bucket is a versioning-disabled bucket, system 620 may no longer reject a delete request to delete the object from the bucket. In response to this delete request, system 620 may erase the only object version of the object from the bucket. Similarly, system 620 may no longer reject a write request to write a different object version of the object to the bucket. In response to this write request, system 620 may overwrite and replace the object version of the object in the bucket with the different object version of the object.

As another example, if the bucket is a versioning-enabled bucket, system 620 may no longer reject a delete request to delete the object version of the object from the bucket. In response to this delete request, system 620 may erase the object version of the object from the bucket. Similarly, system 620 may no longer reject a write request to write a different object version of the object to the bucket. In response to this write request, system 620 may add the different object version of the object to the bucket, and thus the different object version of the object may become the latest object version (e.g., the current object version) of the object in the bucket. Similarly, system 620 may no longer reject a modify request to modify the object version of the object. In response to this modify request, system 620 may generate a different object version of the object that includes the object modification, add the different object version of the object to the bucket, and thus the different object version of the object may become the latest object version (e.g., the current object version) of the object in the bucket.

In some embodiments, for objects that have been retained in the bucket for their retention period and therefore have aged out of the retention policy, system 620 may automatically delete these objects. Accordingly, each object in the bucket may be maintained in the bucket for at least a retention period during which the object cannot be deleted or overwritten, and then the object may be automatically deleted from the bucket when its retention period has passed. In some embodiments, the object may be automatically deleted from the bucket not at the end of the retention period but at a later timestamp. In some embodiments, the object may be strictly prevented from being deletion, modification, and overwriting and can only be automatically deleted, modified, and/or overwritten when its retention has passed. In this case, even if the deletion of the object is delayed (e.g., because the deletion operation has not been executed), system 620 may still prevent the object from being modified.

As an example, if the bucket is a versioning-disabled bucket, system 620 may determine one or more objects in the bucket in which the retention period associated with the only object version of these objects in the bucket has ended. System 620 may then automatically delete the only object version of these objects from the bucket. For example, system 620 may determine, from the only object versions of various objects in the bucket, an only object version of a first object in which a first retention period associated with the object version of the first object has ended. System 620 may also determine, from the only object versions of various objects in the bucket, an only object version of a second object in which a second retention period associated with the object version of the second object has ended. System 620 may then sequentially or simultaneously delete the object version of the first object and the object version of the second object from the bucket in a batch delete operation.

As another example, if the bucket is a versioning-enabled bucket, system 620 may determine one or more object versions of one or more objects in the bucket in which the retention period associated with these object versions of these objects has ended. System 620 may then automatically delete these object versions of these objects from the bucket. For example, system 620 may determine, from various object versions of various objects in the bucket, a first object version and a second object version of a first object in which retention periods associated with the first object version and the second object version of the first object have ended. System 620 may also determine, from various object versions of various objects in the bucket, an object version of a second object in which a retention period associated with the object version of the second object has ended. System 620 may then sequentially or simultaneously delete the first object version and the second object version of the first object and the object version of the second object from the bucket in a batch delete operation.

In some embodiments, system 620 may automatically assign one or more metadata tags to one or more objects in the bucket. For example, for each object version of an object in the bucket, system 620 may automatically assign one or more metadata tags to the object version of the object. The metadata tag may indicate an object attribute of the object version of the object. For example, the metadata tag may indicate a creation timestamp of the object version at which the object version of the object is placed into the bucket, a last modified timestamp of the object version at which the object version of the object in the bucket is modified most recently, a retention complete timestamp of the object version at which a retention period associated with the object version of the object has ended, an object type of the object (e.g., image, audio, video, etc.), a project containing the object, a software application using the object, and/or other object attributes.

In some embodiments, automatically assigning metadata tags to one or more object versions of objects in the bucket is advantageous, because it allows the object versions of the objects to be selectively retrieved based on the metadata tags. In some embodiments, system 620 may detect an operation request associated with a metadata tag. In response to the detecting of the operation request, system 620 may identify, from object versions of objects in the bucket, one or more object versions of one or more particular objects based on the metadata tag and retention periods associated with the object versions of the particular objects. The object versions of the particular objects may be associated with a metadata tag that matches the metadata tag in the operation request and may have their retention period ended. System 620 may then perform the operation request using the object versions of the particular objects.

As an example, system 620 may detect that object-based storage system 610 receives a move request specifying a destination bucket in object-based storage system 610 and a metadata tag that indicates a last modified timestamp of a particular date. In response to the detecting of the move request, system 620 may identify one or more object versions of one or more particular objects in the bucket that have a metadata tag matching the metadata tag in the move request and also have their retention period completed. System 620 may then perform the move request on the object versions of the particular objects. Accordingly, system 620 may move the object versions of the particular objects that have aged out of their retention policy and have the last modified timestamp of the particular date to the destination bucket of object-based storage system 610 as specified by the move request.

In some embodiments, the retention policy may provide additional protection for data in object-based storage system 610 when there is a potential security threat against object-based storage system 610. In some embodiments, system 620 may determine that the data in object-based storage system 610 is possibly being targeted by a security threat (e.g., a ransomware attack). For example, system 620 may determine that the data in object-based storage system 610 is possibly being targeted by the security threat, for example, using any of the security threat detection methods described in the U.S. patent application Ser. No. 16/916,903, filed Jun. 20, 2020, and incorporated herein by reference in its entirety. Additionally or alternatively, system 620 may receive a security threat notification that the data in object-based storage system 610 is possibly being targeted by the security threat from a data protection system coupled to object-based storage system 610. For example, the data protection system may detect a potential security threat against object-based storage system 610 using the security threat detection methods, and transmit the security threat notification to system 620.

In some embodiments, system 620 may prevent, based on the determining that the data in object-based storage system 610 is possibly being targeted by the security threat, one or more object versions of one or more objects in the bucket from being deleted or overwritten during an additional retention period. For example, for an object version of an object that is currently in its retention period, system 620 may restart the retention period of the object version at the current timestamp, thereby extending the time duration in which the object version of the object is prevented from deletion and overwriting beyond the predefined time duration specified by the retention policy. Alternatively, system 620 may apply a security protection period in addition to the retention period to the object version of the object. Thus, when the retention period associated with the object version of the object ends, system 620 may additionally apply a security protection period to the object version of the object. As a result, the object version of the object can only be deleted or overwritten when both the retention period and the security protection period have ended. Similarly, for an object version of an object that has its retention period already ended, system 620 may initiate a security protection period for the object version of the object. The security protection period may start at the current timestamp and the object version of the object can only be deleted or overwritten when the security protection period has ended.

In some embodiments, the time duration of the security protection period additionally applied to the object version of the object may be the same as or may be different from the time duration of the retention period originally applied to the object version of the object. In some embodiments, system 620 may dynamically extend the security protection period for the object version of the object until the security threat against object-based storage system 610 has been verified as false positive, has ended, and/or has been remedied.

In some embodiments, system 620 may apply the retention policy to an object in the bucket in a manner compatible with other policies applied to the object. As an example, system 620 may apply the retention policy compatibly with a lifecycle policy. In some embodiments, system 620 may establish a lifecycle policy for the bucket, and thus an object in the bucket may be subjected to both the lifecycle policy and the retention policy. The lifecycle policy may automatically delete the object from the bucket and/or automatically move the object to a different bucket of object-based storage system 610 when a life event of the object is triggered.

In some embodiments, a life event of the object may occur when the object reaches a certain age. As an example, an object transition event may be triggered when a time duration in which an object version of the object is stored in the bucket satisfies a first time duration threshold. In response to the object transition event, system 620 may automatically transition the object version of the object from the bucket to a different bucket of object-based storage system 610. For example, system 620 may move the object version of the object to a predetermined bucket that has a lower access performance than the current bucket to archive the object version of the object. As another example, an object expiration event may be triggered when the time duration in which the object version of the object is stored in the bucket satisfies a second time duration threshold. In response to the object expiration event, system 620 may automatically delete the object version of the object from the bucket.

In some embodiments, system 620 may determine that the object is subjected to the lifecycle policy in addition to the retention policy. System 620 may also determine that a life event of the object as set forth by the lifecycle policy is triggered during a retention period associated with an object version of the object in the bucket. For example, the lifecycle policy applied to the object may stipulate that an object version of the object may expire and be permanently deleted from the bucket after a first time duration since its creation timestamp. The retention policy applied to the object may stipulate that the object version of the object cannot be deleted or overwritten for a second time duration since its creation timestamp. In some embodiments, the second time duration specified by the retention policy may be longer than the first time duration specified by the lifecycle policy. Therefore, when the object expiration event occurs after the first time duration since the creation timestamp of the object version of the object, the object version of the object may still be in its retention period and therefore cannot be deleted or overwritten. As a result, a delete operation to be applied to the object version of the object in response to the object expiration event according to the lifecycle policy may be conflict with the data protection applied to the object version of the object according to the retention policy.

In some embodiments, to address the conflict between the lifecycle policy and the retention policy applied to the object, system 620 may prioritize the retention policy over the lifecycle policy. For example, in response to the determining that the life event of the object is triggered during the retention period associated with the object version of the object, system 620 may prevent the object version of the object from being deleted from the bucket or being moved to the different bucket until the retention period associated with the object version of the object has ended. Thus, the deletion or movement of the object version of the object according to the lifecycle policy may be delayed until its retention period according to the retention policy has elapsed.

In some embodiments, while the deletion or movement of the object version of the object according to the lifecycle policy is currently delayed due to the retention policy, the retention policy may be disabled for the bucket, for example, based on the predefined rule described herein. In some embodiments, in response to the retention policy being disabled for the bucket, system 620 may allow the object version of the object to be immediately deleted or moved to the different bucket according to the lifecycle policy. Alternatively, system 620 may allow the deletion or movement of the object version of the object according to the lifecycle policy to be performed only after its current retention period according to the retention policy has passed. On the other hand, future object versions of existing objects or future objects being placed into the bucket may be subjected to the lifecycle policy and not the retention policy that is disabled. Therefore, the deletion or movement of these future object versions according to the lifecycle policy may not be impacted by the retention policy.

In some embodiments, instead of prioritizing the retention policy over the lifecycle policy, system 620 may prioritize the lifecycle policy over the retention policy. For example, in response to the determining that the life event of the object is triggered during the retention period associated with the object version of the object, system 620 may proceed with deleting the object version of the object from the bucket or moving the object version of the object to the different bucket according to the lifecycle policy even if the retention period associated with the object version of the object has not ended.

In some embodiments, instead of prioritizing the retention policy or the lifecycle policy, system 620 may automatically disable the lifecycle policy for the bucket (if any) when the retention policy is enabled for the bucket. Alternatively, when the lifecycle policy and/or the retention policy are configured for the bucket, system 620 may verify that the lifecycle policy and the retention policy are compatible with one another. For example, system 620 may only allow the retention policy and/or the lifecycle policy to be set up for the bucket if the first time duration after which an object version of an object in the bucket is automatically deleted or moved to a different bucket according to the lifecycle policy is equal to or longer than the second time duration in which the object version of the object is prevented from deletion and overwriting according to the retention policy.

In some embodiments, system 620 may apply the retention policy compatibly with an indefinite hold policy. In some embodiments, system 620 may establish an indefinite hold policy (e.g., a legal hold policy) for an object in the bucket. The indefinite hold policy may prevent the object from being deleted or overwritten until the indefinite hold policy is disabled for the object. Thus, the object may be subjected to both the indefinite hold policy applied to the object and the retention policy applied to various objects in the bucket.

In some embodiments, system 620 may determine that the object is subjected to the indefinite hold policy in addition to the retention policy. System 620 may also determine that the indefinite hold policy is disabled for the object during a retention period associated with an object version of the object in the bucket. In some embodiments, in response to the determining that the indefinite hold policy is disabled for the object during the retention period associated with the object version of the object, system 620 may prevent the object version of the object from being deleted or overwritten until the retention period associated with the object version of the object has ended. Thus, in this case, the object version of the object may be retained in the bucket at least for the time duration of its retention period, even if the indefinite hold policy is disabled before its retention period has passed. Alternatively, in response to the determining that the indefinite hold policy is disabled for the object during the retention period associated with the object version of the object, system 620 may allow the object version of the object to be immediately deleted or overwritten. Thus, in this case, the object version of the object may no longer be protected from deletion and overwriting when the indefinite hold policy is disabled, even if its retention period has not passed.

In some embodiments, similar to the indefinite hold policy, system 620 may apply the retention policy compatibly with an additional retention policy that is configured for one or more particular object versions of one or more particular objects in the bucket but not for all object versions of all objects in the bucket. For example, an object version of an object may be subjected to a first retention policy that is established for the bucket and applied to each object version of each object in the bucket. The first retention policy may prevent the object version of the object from being deleted or overwritten during a first retention period that starts at a creation timestamp of the object version of the object and extends for a first predefined time duration specified by the first retention policy. In addition to the first retention policy, the object version of the object may also be subjected to a second retention policy that is established for the object version of the object and applied only to the object version of the object. The second retention policy may prevent the object version of the object from being deleted or overwritten during a second retention period that starts at the creation timestamp of the object version of the object and extends for a second predefined time duration specified by the second retention policy.

In some embodiments, if the first retention period has ended but the second retention period has not ended, system 620 may continue to prevent the object version of the object from being deleted or overwritten according to the second retention policy. Additionally or alternatively, if the second retention period has ended but the first retention period has not ended, system 620 may continue to prevent the object version of the object from being deleted or overwritten according to the first retention policy. Accordingly, the object version of the object can only be deleted or overwritten when both the first retention period and the second retention period have ended. Thus, the object version of the object may be protected from deletion and overwriting for the longer retention period among the first retention period specified by the first retention policy and the second retention period specified by the second retention policy.

In some embodiments, system 620 may apply the retention policy compatibly with a replication policy. In some embodiments, system 620 may establish a replication policy for the bucket. The replication policy may automatically replicate an object version of an object in the bucket (also referred to herein as a source bucket) to one or more destination buckets of object-based storage system 610.

In some embodiments, system 620 may establish a first retention policy for the source bucket and a second retention policy for a destination bucket to which the object version of the object is replicated according to the replication policy. The first retention policy applied to the source bucket may prevent an object version of an object in the source bucket from being deleted or overwritten for at least a first predefined time duration. The second retention policy applied to the destination bucket may prevent an object version of an object in the destination bucket from being deleted or overwritten for at least a second predefined time duration.

In some embodiments, the first predefined time duration specified by the first retention policy applied to the source bucket may be equal to or longer than the second predefined time duration specified by the second retention policy applied to the destination bucket. Therefore, the second retention policy applied to the destination bucket may be considered as equally restrictive or less restrictive than the first retention policy applied to the source bucket, respectively. In this case, when an object version of an object in the source bucket is replicated to the destination bucket, the first predefined time duration for which the object version of the object is retained due to the first retention policy may be equal to or longer than the second predefined time duration required by the second retention policy. As a result, the object version of the object may conform to the second retention policy applied to the destination bucket, and therefore the object version of the object can be replicated to the destination bucket without any retention policy conflict. Similarly, if the destination bucket has no retention policy, the object version of the object may also be replicated to the destination bucket without any retention policy conflict.

In some embodiments, the first predefined time duration specified by the first retention policy applied to the source bucket may be shorter than the second predefined time duration specified by the second retention policy applied to the destination bucket. Therefore, the second retention policy applied to the destination bucket may be considered as more restrictive than the first retention policy applied to the source bucket. In this case, when an object version of an object in the source bucket is replicated to the destination bucket, the first predefined time duration for which the object version of the object is retained due to the first retention policy may be shorter than the second predefined time duration required by the second retention policy. As a result, the object version of the object may violate the second retention policy applied to the destination bucket.

In some embodiments, in response to the determining that the object version of the object violates the second retention policy applied to the destination bucket, system 620 may reject the replication of the object version of the object to the destination bucket due to the retention policy conflict. Alternatively, system 620 may delay the replication of the object version of the object until the second predefined time duration specified by the second retention policy has passed. Such delay in data replication may result in high amount of storage space being occupied in the source bucket.

As an example, various object version of various objects may be replicated to the destination bucket and then permanently deleted from the source bucket. However, because of the delay in data replications, system 620 may not erase data associated with the object versions of the objects from the source bucket when the object versions of the objects are deleted. Instead, system 620 may keep the data associated with the object versions of the objects in the source bucket to perform the data replications. System 620 may only free up and reclaim the storage space occupied by the object versions of the objects in the source bucket once the replications of the object versions of the objects to the destination bucket occur. As a result, the object versions of the objects may occupy a relatively high amount of storage space in the source bucket while waiting to be replicated even if the object versions of the objects are subjected to deletion.

In some embodiments, while the replications of the object versions of the objects to the destination bucket are delayed due to the conflict between the first retention policy applied to the source bucket and the second retention policy applied to the destination bucket, the second retention policy may be disabled for the destination bucket, for example, based on the predefined rule described herein. In some embodiments, in response to the second retention policy being disabled for the destination bucket, system 620 may terminate the replication delay and allow the object versions of the objects to be immediately replicated to the destination bucket according to the replication policy. As a result, the storage space occupied by the object versions of the objects in the source bucket can be reclaimed accordingly.

In some embodiments, instead of rejecting or delaying the data replication when there is a retention policy conflict as described above, system 620 may prevent the retention policy conflict between the first retention policy and the second retention policy respectively applied to the source bucket and the destination bucket. For example, when the replication policy is configured for the source bucket, system 620 may verify that the second retention policy applied to the destination bucket is equally restrictive or less restrictive than the first retention policy applied to the source bucket. In particular, system 620 may only allow the replication policy to be set up for the source bucket if the first predefined time duration specified by the first retention policy applied to the source bucket is equal to or longer than the second predefined time duration specified by the second retention policy applied to the destination bucket.

In some embodiments, system 620 may apply the retention policy compatibly with an object versioning policy so that the retention policy may be applicable to both versioning-disabled buckets and versioning-enabled buckets of object-based storage system 610 as described herein. In some embodiments, when the retention policy is enabled for a bucket, each object version of each object existing in the bucket (e.g., an only object version of the object if the bucket is a versioning-disabled bucket, or each object version in one or more object versions of the object if the bucket is a versioning-enabled bucket) may be subject to its retention period. Additionally, each future object version of the existing objects or future objects that is placed into the bucket at a future timestamp may also be subject to its retention period. As described herein, a retention period applied to an object version of an object may start at a creation timestamp at which the object version of the object is placed into the bucket and may extend for the predefined time duration specified by the retention policy.

In some embodiments, the retention policy may be disabled for a bucket, for example, based on a predefined rule described herein. In some embodiments, in response to the determining that the retention policy is disabled for the bucket, system 620 may allow one or more object versions of the objects in the bucket to be immediately deleted or overwritten. Thus, in this case, the object versions of the objects may no longer be protected from deletion and overwriting when the retention policy is disabled for the bucket. Alternatively, in response to the determining that the retention policy is disabled for the bucket, system 620 may prevent each object version of each object existing in the bucket object from being deleted or overwritten until the retention period associated with the object version of the object has ended. For future object versions of the existing objects or future objects being placed into the bucket, these object versions may not be subjected to the retention policy that is disabled, and therefore the deletion or movement of these object versions may not be impacted by the retention policy.

In some embodiments, in order to enable the retention policy for the bucket, system 620 may require the bucket to be a versioning-disabled bucket. Accordingly, for each object, the bucket may store only one object version of the object. System 620 may also prevent an object version of the object from being added to the bucket. For example, system 620 may prevent another object version of the object from being added to the bucket and replacing the existing object version of the object in the bucket, at least during a retention period associated with the existing object version as described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    establishing, by an object retention management system, a retention policy for a bucket of an object-based storage system;
    detecting, by the object retention management system, an operation that causes an object to be stored within the bucket; and
    applying, by the object retention management system based on the detecting of the operation, the retention policy to the object, wherein the retention policy prevents the object from being deleted or overwritten for a predefined time duration and the retention policy cannot be modified or disabled for the bucket by a user.

2. The method of claim 1, wherein:
    the retention policy is modifiable based on a predefined rule that is independent from a user action of the user, the predefined rule specifying a set of required authorizations by one or more authorized entities to modify the retention policy.

3. The method of claim 1, wherein:
    the retention policy can be disabled for the bucket based on a predefined rule that is independent from a user action of the user, the predefined rule specifying a set of required authorizations by one or more authorized entities to disable the retention policy for the bucket.

4. The method of claim 1, wherein:
    the retention policy specifies the predefined time duration based on one or more object attributes of the object.

5. The method of claim 1, wherein the object comprises a first object version and a second object version, and wherein the applying the retention policy to the object includes:
    preventing the first object version from being deleted or overwritten during a first retention period associated with the first object version, the first retention period starting at a creation timestamp of the first object version and extending for the predefined time duration; and
    preventing the second object version from being deleted or overwritten during a second retention period associated with the second object version, the second retention period starting at a creation timestamp of the second object version and extending for the predefined time duration.

6. The method of claim 5, wherein the applying the retention policy to the object includes:
    determining that the first retention period associated with the first object version has ended; and
    allowing, in response to the determining that the first retention period associated with the first object version has ended, the first object version of the object to be deleted or overwritten.

7. The method of claim 1, wherein the applying the retention policy to the object includes:
    determining a latest object version of the object in the bucket; and
    preventing an additional object version of the object from being added to the bucket during a retention period associated with the latest object version of the object.

8. The method of claim 1, wherein the applying the retention policy to the object includes:
    detecting an operation that causes an additional object version to be stored within the bucket;
    determining that a retention period associated with a latest object version of the object has ended;
    storing, in response to the determining that the retention period associated with the latest object version of the object has ended, the additional object version of the object within the bucket; and
    preventing the additional object version of the object from being deleted or overwritten during a retention period associated with the additional object version, the retention period starting at a creation timestamp of the additional object version and extending for the predefined time duration.

9. The method of claim 1, wherein:
    the retention policy prevents the bucket from being eradicated during a recoverable time period after the bucket is deleted; and
    the bucket is ineradicable by the user.

10. The method of claim 1, further comprising:
    determining, by the object retention management system from one or more object versions of one or more objects in the bucket, an object version of a first object and an object version of a second object in which a first retention period associated with the object version of the first object and a second retention period associated with the object version of the second object have ended; and
    automatically deleting, by the object retention management system, the object version of the first object and the object version of the second object from the bucket.

11. The method of claim 1, further comprising:
    automatically assigning, by the object retention management system, one or more metadata tags to one or more objects in the bucket;
    detecting, by the object retention management system, an operation request associated with a metadata tag;
    identifying, by the object retention management system, an object version of a particular object among the one or more objects based on the metadata tag and a retention period associated with the object version; and
    performing the operation request using the object version of the particular object.

12. The method of claim 1, wherein the applying the retention policy to the object further includes:
    determining that data of the object-based storage system is possibly being targeted by a security threat; and
    preventing, based on the determining that the data of the object-based storage system is possibly being targeted by the security threat, one or more object versions of the object from being deleted or overwritten during an additional retention period.

13. A system comprising:
    a memory storing instructions; and
    a processor communicatively coupled to the memory and configured to execute the instructions to:
        establish a retention policy for a bucket of an object-based storage system;
        detect an operation that causes an object to be stored within the bucket; and
        apply, based on the detecting of the operation, the retention policy to the object, wherein the retention policy prevents the object from being deleted or overwritten for a predefined time duration and the retention policy cannot be modified or disabled for the bucket by a user.

14. The system of claim 13, wherein:
the retention policy is modifiable based on a predefined rule that is independent from a user action of the user, the predefined rule specifying a set of required authorizations by one or more authorized entities to modify the retention policy.

15. The system of claim 13, wherein:
the retention policy can be disabled for the bucket based on a predefined rule that is independent from a user action of the user, the predefined rule specifying a set of required authorizations by one or more authorized entities to disable the retention policy for the bucket.

16. The system of claim 13, wherein:
the retention policy specifies the predefined time duration based on one or more object attributes of the object.

17. The system of claim 13, wherein the object comprises a first object version and a second object version, and wherein the applying the retention policy to the object includes:
preventing the first object version from being deleted or overwritten during a first retention period associated with the first object version, the first retention period starting at a creation timestamp of the first object version and extending for the predefined time duration; and
preventing the second object version from being deleted or overwritten during a second retention period associated with the second object version, the second retention period starting at a creation timestamp of the second object version and extending for the predefined time duration.

18. The system of claim 17, wherein the applying the retention policy to the object includes:
determining that the first retention period associated with the first object version has ended; and
allowing, in response to the determining that the first retention period associated with the first object version has ended, the first object version of the object to be deleted or overwritten.

19. The system of claim 13, wherein the applying the retention policy to the object includes:
determining a latest object version of the object in the bucket; and
preventing an additional object version of the object from being added to the bucket during a retention period associated with the latest object version of the object.

20. A non-transitory computer-readable medium storing instructions that, when executed, direct a processor of a computing device to:
establish a retention policy for a bucket of an object-based storage system;
detect an operation that causes an object to be stored within the bucket; and
apply, based on the detecting of the operation, the retention policy to the object, wherein the retention policy prevents the object from being deleted or overwritten for a predefined time duration and the retention policy cannot be modified or disabled for the bucket by a user.

* * * * *